(12) United States Patent
Chen et al.

(10) Patent No.: US 12,086,719 B2
(45) Date of Patent: Sep. 10, 2024

(54) SYSTEM AND METHOD OF MACHINE LEARNING USING EMBEDDING NETWORKS

(71) Applicant: ROYAL BANK OF CANADA, Toronto (CA)

(72) Inventors: Lei Chen, Burnaby (CA); Jianhui Chen, Vancouver (CA); Seyed Hossein Hajimirsadeghi, Vancouver (CA); Gregory Mori, Burnaby (CA)

(73) Assignee: ROYAL BANK OF CANADA, Toronto (CA)

(*) Notice: Subject to any disclaimer, the term of this patent is extended or adjusted under 35 U.S.C. 154(b) by 942 days.

(21) Appl. No.: 17/067,194

(22) Filed: Oct. 9, 2020

(65) Prior Publication Data

US 2021/0110275 A1    Apr. 15, 2021

Related U.S. Application Data

(60) Provisional application No. 62/914,100, filed on Oct. 11, 2019.

(51) Int. Cl.
*G06N 3/084* (2023.01)
*G06F 18/214* (2023.01)
(Continued)

(52) U.S. Cl.
CPC ............ *G06N 3/084* (2013.01); *G06F 18/214* (2023.01); *G06F 18/22* (2023.01);
(Continued)

(58) Field of Classification Search
CPC ...... G06N 3/084; G06N 3/045; G06F 18/214; G06F 18/22; G06F 18/24147;
(Continued)

(56) References Cited

U.S. PATENT DOCUMENTS 9,877,957 B2 * 1/2018 Imbriglio .............. C07D 487/04
10,755,082 B2 * 8/2020 Wang ................... G06V 10/764
(Continued)

OTHER PUBLICATIONS

Hendricks et al.; "Grounding Visual Explanations"; European Conference on Computer Vision (ECCV), 2018.
(Continued)

*Primary Examiner* — Hien L Duong
(74) *Attorney, Agent, or Firm* — Norton Rose Fulbright Canada LLP

(57) ABSTRACT

Systems and methods of generating interpretive data associated with data sets. Embodiments of systems may be for adapting Grad-CAM methods for embedding networks. The system includes a processor and a memory. The memory stores processor-executable instructions that, when executed, configure the processor to: obtain a subject data set; generate a feature embedding based on the subject data set; determine an embedding gradient weight based on a prior-trained embedding network and the feature embedding associated with the subject data set, the prior-trained embedding network defined based on a plurality of embedding gradient weights respectively corresponding to a feature map generated based on a plurality of training samples, and wherein the embedding gradient weight is determined based on querying a feature space for the feature embedding associated with the subject data set; and generate signals for communicating interpretive data associated with the embedding gradient weight.

20 Claims, 14 Drawing Sheets

(51) Int. Cl.

| | |
|---|---|
| *G06F 18/22* | (2023.01) |
| *G06F 18/2413* | (2023.01) |
| *G06V 10/74* | (2022.01) |
| *G06V 10/75* | (2022.01) |
| *G06V 10/764* | (2022.01) |
| *G06V 10/772* | (2022.01) |
| *G06V 10/774* | (2022.01) |
| *G06V 10/82* | (2022.01) |

(52) U.S. Cl.
CPC ...... *G06F 18/24147* (2023.01); *G06V 10/751* (2022.01); *G06V 10/761* (2022.01); *G06V 10/764* (2022.01); *G06V 10/765* (2022.01); *G06V 10/772* (2022.01); *G06V 10/774* (2022.01); *G06V 10/82* (2022.01)

(58) Field of Classification Search
CPC .. G06V 10/751; G06V 10/761; G06V 10/764; G06V 10/765; G06V 10/772; G06V 10/774; G06V 10/82
See application file for complete search history.

(56) References Cited

U.S. PATENT DOCUMENTS

| | | | | |
|---|---|---|---|---|
| 11,216,701 | B1* | 1/2022 | Sim | G06F 18/2163 |
| 11,900,244 | B1* | 2/2024 | Genc | G06N 3/006 |
| 2006/0082592 | A1* | 4/2006 | Black-Ziegelbein | |
| | | | | G06T 11/206 |
| | | | | 345/605 |
| 2007/0072924 | A1* | 3/2007 | Semple | C07D 403/04 |
| | | | | 548/253 |
| 2007/0262269 | A1* | 11/2007 | Trbojevic | G21K 1/093 |
| | | | | 250/398 |
| 2010/0038552 | A1* | 2/2010 | Trbojevic | H05H 7/04 |
| | | | | 250/396 ML |
| 2012/0313003 | A1* | 12/2012 | Trbojevic | A61N 5/1081 |
| | | | | 250/396 ML |
| 2013/0072492 | A1* | 3/2013 | Raghavan | A61P 3/10 |
| | | | | 544/280 |
| 2013/0331419 | A1* | 12/2013 | Crespo | A61K 31/4245 |
| | | | | 548/362.5 |
| 2014/0256723 | A1* | 9/2014 | Shen | C07D 413/04 |
| | | | | 544/137 |
| 2014/0336224 | A1* | 11/2014 | Lan | A61K 31/4245 |
| | | | | 548/362.5 |
| 2015/0166490 | A1* | 6/2015 | Shen | A61K 31/421 |
| | | | | 514/307 |
| 2017/0216325 | A1* | 8/2017 | Thompson, III | A61P 25/16 |
| 2017/0273965 | A1* | 9/2017 | Imbriglio | C07D 401/04 |
| 2017/0275274 | A1* | 9/2017 | Imbriglio | C07D 405/12 |
| 2017/0357896 | A1* | 12/2017 | Tsatsin | G06N 3/045 |
| 2018/0165546 | A1* | 6/2018 | Skans | G06N 3/084 |
| 2019/0286652 | A1* | 9/2019 | Habbecke | G06F 16/7837 |
| 2020/0004918 | A1* | 1/2020 | Sha | G03F 7/705 |
| 2020/0035342 | A1* | 1/2020 | Kivatinos | G06N 3/084 |
| 2020/0073933 | A1* | 3/2020 | Zhao | G06F 40/117 |
| 2021/0070698 | A1* | 3/2021 | Balog | C07D 295/155 |
| 2021/0097382 | A1* | 4/2021 | Mathews | G06N 3/045 |
| 2021/0206723 | A1* | 7/2021 | Balog | C07D 401/06 |

OTHER PUBLICATIONS

Bau et al.; "Network Dissection: Quantifying Interpretability of Deep Visual Representations"; IEEE Conference on Computer Vision and Pattern Recognition (CVPR), 2017.
Bency et al.; "Beyond Spatial Auto-Regressive Models: Predicting Housing Prices with Satellite Imagery"; Cornell University, Computer Science, Computer Vision and Pattern Recognition, Oct. 2016—arXiv:1610.04805v1.
Burges et al.; "Learning to Rank using Gradient Descent"; Proceedings of the 22nd International Conference on Machine Learning (ICML), 2005.
Chen et al.; "Explaining Neural Networks Semantically and Quantitatively"; Cornell University, Computer Science, Computer Vision and Pattern Recognition, Dec. 2018—arXiv:1812.07169v1.
A. Dosovitskiy and T. Brox; "Inverting Visual Representations with Convolutional Networks"; IEEE Conference on Computer Vision and Pattern Recognition (CVPR), 2016.
Y. Jeong and H. O. Song; "Efficient end-to-end learning for quantizable representations"; Proceedings of the 35th International Conference on Machine Learning (ICML), Jun. 2018.
Kim et al.; "Deep Metric Learning Beyond Binary Supervision"; IEEE Conference on Computer Vision and Pattern Recognition (CVPR), Apr. 2019.
P. W. Koh and P. Liang; "Understanding Black-box Predictions via Influence Functions"; Proceedings of the 34th International Conference on Machine Learning (ICML), Jul. 2017.
Law et al.; "Take a Look Around: Using Street View and Satellite Images to Estimate House Prices"; International Workshop on Urban Computing (UrbComp 2018), 2018.
Liu et al.; "SIFT Flow: Dense Correspondence across Scenes and its Applications.";IEEE Transactions on Pattern Analysis and Machine Intelligence (PAMI), vol. 33, No. 5, pp. 978-994, 2011.
Scott M. Lundberg and Su-In Lee; "A Unified Approach to Interpreting Model Predictions"; Proceedings of the 31st International Conference on Neural Information Processing Systems (NIPS), 2017.
Song et al.; "Deep Metric Learning via Lifted Structured Feature Embedding"; IEEE Conference on Computer Vision and Pattern Recognition (CVPR), 2016.
Poursaeed et al.; "Vision-based Real Estate Price Estimation"; Machine Vision and Applications (MVA), vol. 29, No. 4, pp. 667-676, 2018.
Sanakoyeu et al.; "Divide and Conquer the Embedding Space for Metric Learning"; IEEE Conference on Computer Vision and Pattern Recognition (CVPR), Jun. 2019.
Schroff et al.; "FaceNet: A Unified Embedding for Face Recognition and Clustering"; IEEE Conference on Computer Vision and Pattern Recognition (CVPR), 2015.
Selvaraju et al.; "Choose Your Neuron: Incorporating Domain Knowledge through Neuron-Importance"; European Conference on Computer Vision (ECCV), 2018.
Selvaraju et al.; "Grad-CAM: Visual Explanations from Deep Networks via Gradient-based Localization"; IEEE International Conference on Computer Vision (ICCV), 2017.
F. Tung and J. J. Little; "CollageParsing: Nonparametric Scene Parsing by Adaptive Overlapping Windows"; European Conference on Computer Vision (ECCV), 2014.
Wah et al.; "The Caltech-UCSD Birds-200-2011 Dataset"; Computation & Neural Systems Technical Report, CNS-TR-2011-001, 2011.
Wang et al.; "Deep Metric Learning with Angular Loss"; IEEE International Conference on Computer Vision (ICCV), 2017.
Wu et al.; "Sampling Matters in Deep Embedding Learning"; IEEE International Conference on Computer Vision (ICCV), 2017.
M. D. Zeiler and R. Fergus; "Visualizing and Understanding Convolutional Networks"; European Conference on Computer Vision (ECCV), 2014.
Zhang et al.; "Interpretable Convolutional Neural Networks"; IEEE Conference on Computer Vision and Pattern Recognition (CVPR), 2018.
Zheng et al.; "Re-Identification with Consistent Attentive Siamese Networks"; IEEE Conference on Computer Vision and Pattern Recognition (CVPR), Apr. 2019.
Zheng at al.; "Hardness-Aware Deep Metric Learning"; IEEE Conference on Computer Vision and Pattern Recognition (CVPR), Mar. 2019.
Zhou et al.; "Learning Deep Features for Discriminative Localization"; IEEE Conference on Computer Vision and Pattern Recognition (CVPR), 2016.
Zhou et al.; "Interpretable Basis Decomposition for Visual Explanation"; European Conference on Computer Vision (ECCV), 2018.

* cited by examiner

SYSTEM AND METHOD OF MACHINE LEARNING USING EMBEDDING NETWORKS

CROSS REFERENCE TO RELATED APPLICATIONS

This application claims priority from U.S. provisional patent application No. 62/914,100, entitled "SYSTEM AND METHOD OF MACHINE LEARNING USING EMBEDDING NETWORKS", filed on Oct. 11, 2019, the entire contents of which are hereby incorporated by reference herein.

FIELD

Embodiments of the present disclosure relate to the field of machine learning, and in particular to systems and methods of machine learning using embedding networks.

BACKGROUND

Computing devices may be configured to conduct operations of deep neural networks for tasks such as object classification, detection, visual feature embedding, among other examples. In addition to the above described example tasks, computing devices may be configured to generate explanation or interpretation of deep neural network outputs. For example, interpretable neural networks may provide explanations or interpretations associated with neural network output.

SUMMARY

The present disclosure describes systems and methods for generating interpretation or explanation data sets associated with neural network output. In some embodiments, the neural network output may be based on an input data set associated with a query. For instance, an image may be obtained and may be associated with a prediction query, such as "What type of dog is shown in the photo?" or "What is the estimated value of the house shown in the photo?" Numerous examples herein may be based on image data applications; however, embodiments of the present disclosure may be implemented for providing explanation or interpretation data for non-image data.

Some example systems for generating interpretation or explanation data may include gradient-weighted class activation mapping (Grad-CAM) systems, which may be classification-based networks. Grad-CAM may be based on using gradients, from back propagation, as weights to highlight pertinent regions of testing data (e.g., image data or non-image data).

Embedding networks may map data sets to an embedding feature space, such that similarities among data may be proximal in the embedding feature space. In some examples, embedding networks may represent discrete variables as continuous vectors, thereby reducing dimensionality of categorical variables and representing the categories in a transformed space.

It may be beneficial to provide systems for generating interpretation or explanation data for embedding networks based on forward propagation operations. Directly applying Grad-CAM operations to embedding networks may be challenging at least because embedding networks do not provide per-class scores during training/testing. Further embedding networks may not compute gradients from a single testing image, as a testing image may not be associated with labels.

The present disclosure describes systems for adapting Grad-CAM methods for embedding networks. In some embodiments, systems may include a pre-trained embedding network for providing grad-CAM style visual explanations based on image testing data. In some embodiments, systems may adapt the Grad-CAM method by generating embedding grad-weights from training data sets. In some embodiments, the training data sets may be based on one or more triples, respectively including anchor data, positive data, and negative data. During training, triplet loss data may include similarity information based on anchor/positive and anchor/negative pairs, thereby providing useful information about pertinent regions of an anchor image. Based on training embedding networks with triplet samples, computation of class gradients may be modified by replacing a class-score with triplet loss data.

When a training sample and a subsequent testing sample may be similar or proximally near in an embedding feature space, the images may generally have similar semantic attributes. For instance, if attributes (e.g., red pixels of a bird head) are activated by convolutional kernels (e.g., top-weight channels) in training samples, similar convolutional kernels may be activated by similar attributes in a testing image. Accordingly, embodiment systems disclosed herein may transfer prior generated grad-weights associated with feature embeddings based on nearest neighbor search operations of the embedding feature space, such that the transferred grad-weights may be used for generating explanation or interpretation data of testing images without back propagation. Other features of embodiment systems and methods will be described in the present disclosure.

In one aspect, the present disclosure provides a system for machine learning architecture to generate interpretive data associated with data sets. The system may include a processor and a memory coupled to the processor and storing processor-executable instructions. The processor-executable instructions, when executed, may configure the processor to: obtain a subject data set; generate a feature embedding based on the subject data set; determine an embedding gradient weight based on a prior-trained embedding network and the feature embedding associated with the subject data set, the prior-trained embedding network defined based on a plurality of embedding gradient weights respectively corresponding to a feature map generated based on a plurality of training samples, and wherein the embedding gradient weight is determined based on querying a feature space for the feature embedding associated with the subject data set; and generate signals for communicating interpretive data associated with the embedding gradient weight.

In another aspect, the present disclosure provides a method for machine learning architecture to generate interpretive data associated with data sets. The method may include: obtaining a subject data set; generating a feature embedding based on the subject data set; determining an embedding gradient weight based on a prior-trained embedding network and the feature embedding associated with the subject data set, the prior-trained embedding network defined based on a plurality of embedding gradient weights respectively corresponding to a feature map generated based on a plurality of training samples, and wherein the embedding gradient weight is determined based on querying a feature space for the feature embedding associated with the subject data set; and generating signals for communicating interpretive data associated with the embedding gradient weight.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
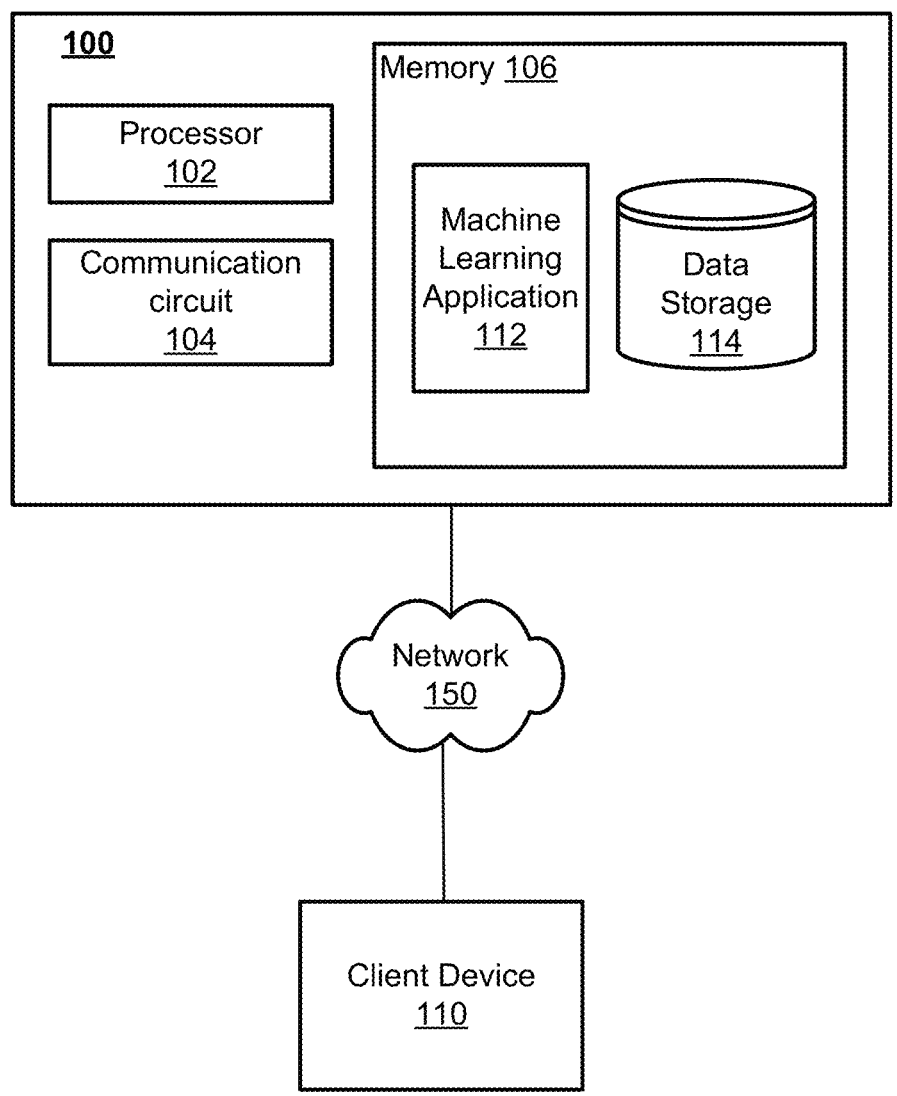
FIG. 1 illustrates a system for machine learning architecture, in accordance with an embodiment of the present disclosure.

Systems and methods for machine learning architecture to generate interpretive data for input data sets are described in the present disclosure. In some examples, systems may generate explanations associated with machine learning output.

In some embodiments, systems may receive input images, provide predictions based on a query and the input images, and provide a visual explanation, including visual annotations (e.g., heat maps) for highlighting pertinent regions of an image that may have contributed to the generated predictions. As an example, an image of a dog may have a heat map overlaid thereon for identifying features of the dog or regions of the image that contributed to a prediction that the image depicts a "bull dog". Embodiments described in the present disclosure may be illustrated based on image data examples. It may be appreciated that embodiments of the present disclosure may also be implemented for providing explanation or interpretation data for non-image data.

In some embodiments, the explanations may include captions for identifying portions of input data sets that were important in supporting a prediction provided based on the input data sets. For instance, input data sets may include data sets representing banking account transactions for a plurality of users. A prediction may include identifying one or more bank account customers who may require a mortgage in the next 6 months and an explanation may include captioned text to identify subset portions of the data sets representing the bank account data that contributed to the prediction that: "Person A will very likely require a mortgage with mortgage amount greater than $2 million in combination with wealth management banking services".

In some examples, explanations may include metadata associated with audio or acoustic signals, and explanations may provide interpretive information associated with speech recognition (e.g., voice on audio recording spoke with frustration) thereby providing context to recognized speech.

In some examples, explanations may include metadata to provide context associated with data structures storing graphical user interface (GUI) interaction data (e.g., mouse click data, web page scrolling data, etc.), thereby providing context as to a user's GUI interactions based on identified sequences of GUI interactions. For instance, where a banking institution webpage for providing insurance premium rates include user interface elements for dynamically receiving user input on insurance premium options (e.g., deductible amount, monetary coverage amount, etc.), explanations may include metadata indicating that the GUI interactions are associated insurance premium options that traditionally reduce payable insurance premium amounts. Other examples may be contemplated.

In some examples, systems based on gradient-weighted class activation mapping (Grad-CAM) may generate explanation data based on gradients associated with a target concept (e.g., 'dog' in a classification network or a sequence of words in a captioning network) flowing into a final convolutional layer, thereby producing a coarse localization map highlighting regions of a test image for predicting the target concept (e.g., that the image depicts a dog). Such explanation data may be associated with discrete classification data based on back propagation operations.

It may be beneficial to provide systems and methods for providing interpretive data associated with testing data sets based on embedding networks and without back propagation operations. In some embodiments, embedding networks may be based on mapping functions associating nodes in the network to latent representations of the nodes. The latent representations may be used as features for tasks on graphs, such as classification, clustering, link prediction, or visualization, among other examples. For instance, visual embedding networks may map images to an embedding feature space, such that similarities among images may be associated with portions of the embedding feature space. It may be beneficial to provide systems and methods for generating Grad-CAM-style explanation data based on embedding networks, reducing reliance on back propagation operations.

Adapting Grad-CAM based operations to embedding networks may be challenging at least because: (1) embedding networks may not provide per-class scores during training/testing; and (2) it may not be feasible to compute gradients for single images during testing because testing images may not have labels or may not be paired images.

To overcome challenges of adapting Grad-CAM based operations to embedding networks, embodiments of the present disclosure may include systems for providing explanation or interpretation data based on gradient weight transfer operations from a prior-trained embedding network, such as a triplet embedding network, a Siamese embedding network, among other examples. In some embodiments, the prior-trained embedding network may be trained based on a plurality of triplet samples of a training data set, and the prior-trained embedding network may be based on Grad-CAM operations to estimate gradient weights for associating with feature maps in a feature space. Such gradient weights may be associated with feature embeddings.

Upon obtaining a test data set, systems may determine a feature embedding associated with the test data set and query a feature space to identify gradient weights associated with feature maps having similarities to the feature embedding. In some embodiments, querying the feature space may be based on a nearest neighbour search. Based on the identified gradient weights, systems may generate interpretation or explanation data for the test data set, thereby providing explanations for machine learning output without back propagation operations. Other features of embodiment systems and methods will be described in the present disclosure.

In the field of machine learning, explanation or interpretation data associated with neural network output may be a challenging technical problem. Some proposed methods for providing explanation or interpretation data include methods of visualization of network features [23, 6, 18], extraction of correlations between network inputs and outputs [9, 12], semantic and quantitative explanation [24, 5], among other examples. However, some of the example methods may be designed for classification tasks or the network has classification branches. Few example approaches may be designed for embedding networks. Zheng et. al [25] describes a consistent attentive siamese network for person re-identification and generates a Grad-CAM heatmap for visualization. However, the network method includes an extra classification branch, which is not a general solution for embedding networks. In embodiments described herein, the systems may conduct operations of embedding networks, such as siamese/triplet networks, thereby expanding application areas for network explanation.

In some embodiments described herein, systems and methods may extend the Grad-CAM method [18] to explain embedding networks. The technique of Grad-CAM includes using gradients as weights (grad-weights) to highlight important regions in images. Grad-CAM may be implemented for classification-based networks. However, embedding networks may be implemented differently as compared classification networks in terms of network structure and training processes. Directly applying Grad-CAM to embedding networks may provide either intractable gradients or unstable results.

Embodiments of the systems and methods described herein may be configured to adapt Grad-CAM to visualize embedding features using forward propagation operations. In some scenarios, the methods may be related to non-parametric methods such as SIFT flow [11] for depth estimation and Collageparsing [19] for semantic scenes parsing. Example non-parametric methods may use the nearest neighbor search (NNS) in a database to find the optimal hidden states (e.g. scene depth or semantic labels) of images. In some embodiments of the present disclosure, the grad-weights (or gradient weights) may represent hidden states of an image (when the network weights are fixed) and may be searched in a pre-trained/pre-generated database. Example operations described herein may be suitable for embedding networks as they naturally provide features for nearest neighbor search.

Visual feature embedding includes operations for learning feature vectors from images based on deep convolutional neural networks (CNNs). The operations may be conducted in computer vision applications for answering questions such as: "how similar are two images?" Researchers have explored many directions on this area, including loss functions [16, 8, 21] for pair/triplet images, sampling methods for training examples [13, 22, 26], compactness representation [7] and learning strategies such as divide and conquer [15]. In some examples, trained models may be trained by techniques disclosed herein.

Interpretable neural networks may be directed to explaining the decision of networks. For example, class activation map (CAM) [27] and grad-CAM [18] may provide localized visual evidence or annotations on images corresponding to predictions. These methods may produce a heat-map overlaid on an input image, showing particular regions of the input image that may support a neural network output.

Approaches from various aspects for different applications may be implemented [1, 25]. Some example approaches may include specific learning processes [24] or may require extra labeled data [2, 28]. For example, Zhang et. al [24] discloses interpretable CNNs that learn interpretable filters for specific object parts without labeling the object parts. Bau et al. [2] discloses network dissection to quantitatively measure the interpretability of neural network representations via aligning individual hidden units to a set of pre-defined semantic concepts using densely annotated datasets. Chen et al. [5] discloses a knowledge distillation based method that uses explainable models to provide a quantitative explanation for CNN predictions. The explainable models may be separately trained so that the method does not degrade the performance the network. Embodiments of the systems and methods described herein may not require extra training process or extra data annotation, but may maintain the discrimination power of embedding networks.

As non-limiting examples, systems and methods may conduct operations for house price estimation using visual features. In some embodiments, images may be used to improve the house price estimation operations. For example, Bency et al. [3] discloses a method to estimate the property value using satellite images and point of interest data (e.g. restaurant number near the property). Poursaeed et al. [14] discloses the impact of visual features of a house on its market value using predicted luxury level from interior and exterior photos. Law et. al [10] describes both street-view image and satellite images for house price prediction. In visual feature extraction, in some examples, an end-to-end regression network may be implemented to learn the one-dimension visual feature. In some embodiments, visual features may improve prediction accuracy.

Numerous embodiments described in the present disclosure may be illustrated based on image data examples. It may be appreciated that embodiments of the present disclosure may also be implemented for providing explanation or interpretation data for non-image data. As non-limiting examples, in the context of banking institution systems, non-image data sets may include database records or data structures storing banking customer records, transaction records, graphical user interface interaction data (e.g., mouse click data, web page scrolling data, etc. associated with a customer using a banking institution's website), acoustic signals (e.g., voice recordings associated with telephone conversations, etc.), among other examples.

Reference is made to FIG. 1, which illustrates a system 100 for machine learning architecture to generate interpretive data associated with data sets, in accordance with an embodiment of the present disclosure. The system 100 may transmit and/or receive data messages to/from a client device 110 via a network 150. The network 150 may include a wired or wireless wide area network (WAN), local area network (LAN), a combination thereof, or the like.

The system 100 includes a processor 102 configured to execute processor-readable instructions that, when executed, configure the processor 102 to conduct operations described herein. For example, the system 100 may be configured to conduct operations for providing neural network output and explanation or interpretation data associated with the neural network output.

The processor 102 may be a microprocessor or microcontroller, a digital signal processing (DSP) processor, an integrated circuit, a field programmable gate array (FPGA), a reconfigurable processor, a programmable read-only memory (PROM), or combinations thereof.

The system 100 includes a communication circuit 104 to communicate with other computing devices, to access or connect to network resources, or to perform other computing applications by connecting to a network (or multiple networks) capable of carrying data. In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, and others, including combination of these. In some examples, the communication circuit 104 may include one or more busses, interconnects, wires, circuits, and/or any other connection and/or control circuit, or combination thereof. The communication circuit 104 may provide an interface for communicating data between components of a single device or circuit.

The system may include memory 106. The memory 106 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 106 may store a machine learning application 112 including processor readable instructions for conducting operations described herein. In some examples, the machine application 112 may include operations for generating interpretive data associated with neural network output. For example, the interpretive data may provide visual annotations of image data for highlighting pertinent portions of an image contributing to neural network output. Other example operations may be contemplated and are disclosed herein.

The system 100 may include a data storage 114. In some embodiments, the data storage 114 may be a secure data store. In some embodiments, the data storage 114 may store input data sets, such as image data, or training data sets, such as triplets, or the like.

The client device 110 may be a computing device including a processor, memory, and a communication interface. In some embodiments, the client device 110 may be a computing device associated with a local area network. The client device 110 may be connected to the local area network and may transmit one or more data sets, via the network 150, to the system 100. The one or more data sets may be input data for querying the system 100 for providing neural network output. For example, neural network output may include predictions (e.g., what type of dog is depicted in an input image? What is the estimated property value of a house based on satellite image data and property attributes? etc.). The system 100 may be configured to provide interpretation data drawing attention to portions of the input image for explaining neural network decisions. Other operations may be contemplated.

Figure 2:
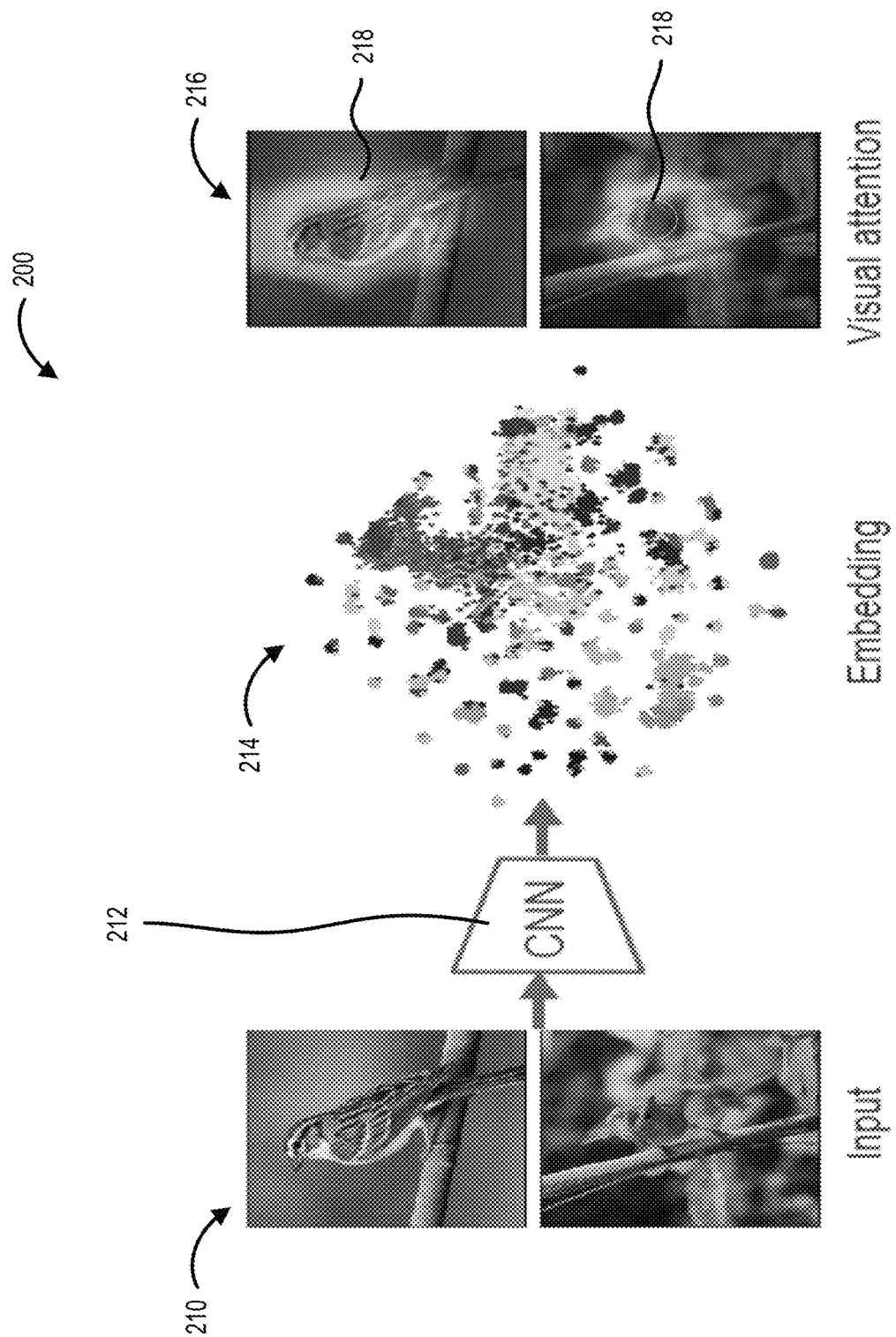
FIG. 2 illustrates a flowchart diagram illustrating input images being provided to a convolutional neural network for generating feature embeddings, in accordance with an embodiment of the present disclosure.

Reference is made to FIG. 2, which illustrates a flowchart diagram 200 illustrating input images 210 being provided to a convolutional neural network (CNN) 212 for generating feature embeddings in an embedding feature space 214. The flowchart diagram 200 illustrates a system providing output images 216 including visual annotations 218 of the input images, thereby highlighting portions or features of the input images that may correspond to a neural network output. As an example, the neural network output may include data identifying the species of bird, and the visual annotations may highlight portions of the image or particular features of the bird that contributed to the identification of the bird species.

In some embodiments, the visual annotations may include color codes in the form of a heat map, shaded indicators, or other types of visual annotations. In FIG. 2, the portions of the depicted bird head may be highlighted with red color, and regions leading away from the bird head may transition from orange, yellow, green, and blue. For ease of exposition, in FIG. 2, the visual annotation provided on the output image 216 at the lower portion of the diagram may be an ellipse for highlighting portions of the bird head that contributed to classification of bird as being of a particular species.

In some embodiments, visual embedding networks may map images to an embedding (feature) space so that the similarity between images may be kept in the feature space. As a non-limiting example, embodiment systems disclosed herein may include a triplet network [16, 22, 8]. The triplet network may include three shared-weights branches (e.g. CNNs) and obtain a triplet 310. The triplet 310 may be a training data set that includes an anchor image, a positive image, and a negative image. Systems disclosed herein may penalize triplets violating the rank constraint, namely, that the distance between the anchor and the positive must be smaller than that between the anchor and the negative in the embedding space. The loss may be formulated as:

$$\mathcal{L}_{tri}(a,p,n)=[D(f_a,f_p)-D(f_a,f_n)+\delta]_+,$$

where f indicates an embedding vector, D(•) is the squared Euclidean distance, δ is a margin, and $[\bullet]_+$ denotes the hinge function. The embedding vectors may be $L_2$ normalized.

In some training examples, millions of triplets may be dynamically generated to minimize the loss. In testing, the branch network may output the feature from an input image. In examples described herein, the network may be trained and its weights may be fixed for visualization.

In some embodiments, Grad-CAM [18] may utilize the gradient information flowing into the last convolutional layer of the CNN for determining importance of each neuron for making decisions (e.g. predict a "dog" image). To obtain a class discriminative localization map for a particular class c, the method may first compute the gradient of the score $y^c$ (before softmax) with respect to the feature maps $A_k$:

$$g_c(A^k) = \frac{\partial y^c}{\partial A^k}, \quad (2)$$

in which is the channel index. Embodiment systems may average the gradients as the neural importance weight $\alpha_k^c$ in respective channels:

$$\alpha_k^c = \frac{1}{Z}\sum_i\sum_j \frac{\partial y^c}{\partial A_{i,j}^k}, \quad (3)$$

in which (i, j) is the spatial index and Z is the spatial resolution of the feature map. This weight may be a grad-weight. Further, Grad-CAM may be a weighted sum of feature maps, followed by a Rectified Linear Unit (ReLU) operator:

$$H^c_{Grad-CAM} = ReLU\left(\sum_k \alpha_k^c A^k\right). \quad (4)$$

Accordingly, Grad-CAM may provide a class specific heat map having the same size as the feature maps.

Equation (4) includes two parts: grad-weights $\alpha_k^c$ and feature maps $A^k$. For an embedding network, systems may generate the feature maps based on forward propagation operations. On the other hand, systems for generating grad-weights may require a per-class score $y^c$ and may be based on backward propagation operations. In some scenarios, $y^c$ may be any differentiable activation [18]. In some other scenarios, $y^c$ may be mostly based on classification-based activations. For example, when Grad-CAM is applied to image captioning, the log probability of a predicted word (i.e. a 1000-way classification) may be used as $y^c$ to compute the grad-weights.

In some embodiments of the present disclosure, given a prior-trained embedding network and a testing data set, systems and methods may generate annotations associated with the testing data set for providing explanations or interpretations based on forward propagation operations. In some embodiments, the annotated images for providing explanation may be provided without requiring back-propagation operations.

Figure 3:
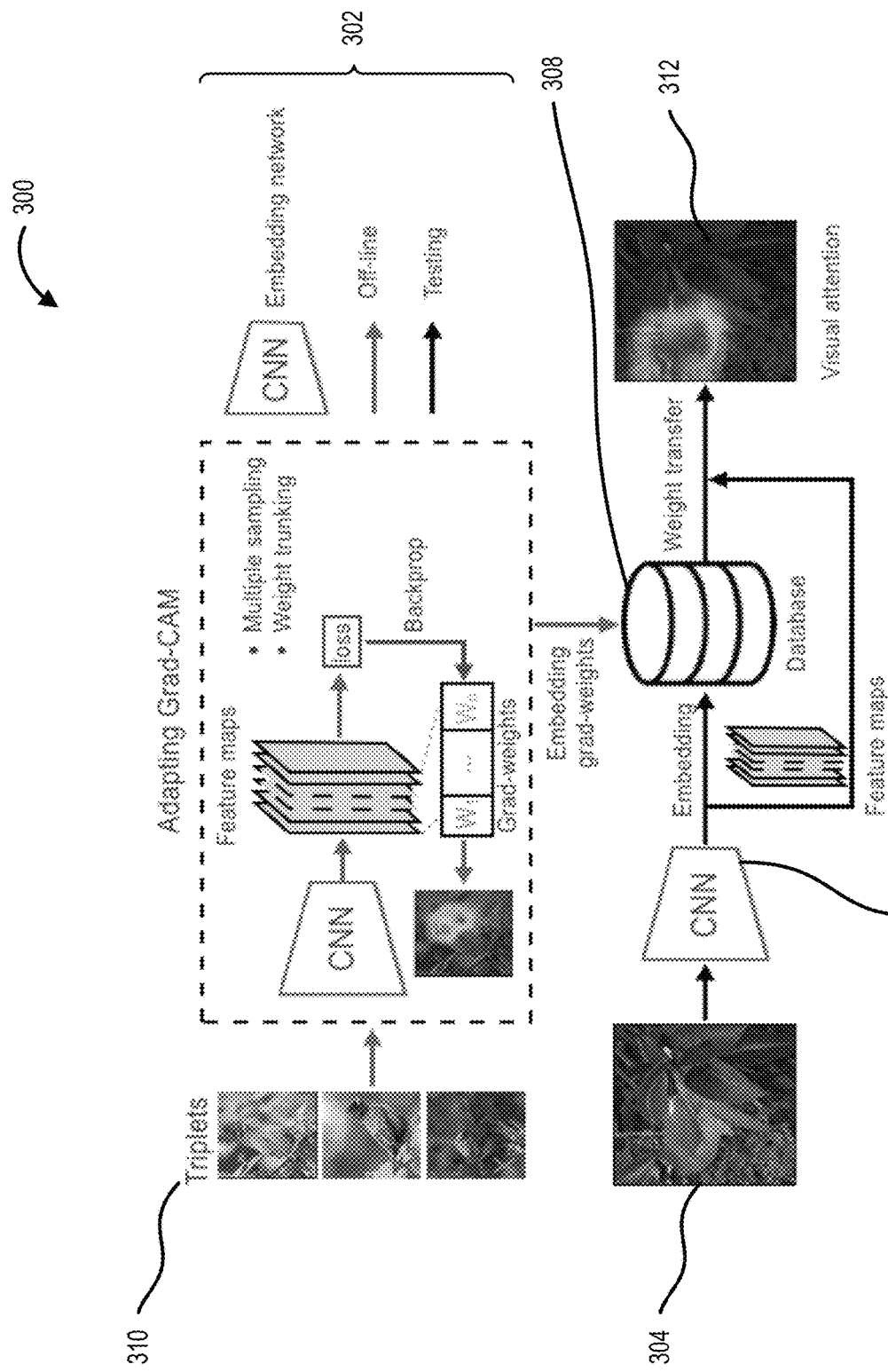
FIG. 3 illustrates a system for adapting gradient-weighted class activation mapping (Grad-CAM) operations to an embeddings network, in accordance with embodiments of the present disclosure.

Reference is made to FIG. 3, which illustrates a system 300 adapting gradient-weighted class activation mapping (Grad-CAM) operations to an embedding network, in accordance with embodiments of the present disclosure. The system 300 may generate Grad-CAM style visual explanations of machine learning output based on Grad-CAM [18] operations.

In FIG. 3, an embedding network 302 may be pre-trained based on one or more triplet training samples 310. In some embodiments, the embedding network 302 may be a triplet embedding network. For ease of exposition, a triplet network is illustrated, and other types of embedding networks may be contemplated.

The one or more triplet training samples 310 may be received at a convolutional neural network (CNN) for generating feature maps for generating an embedding/grad-weights data set. In some embodiments, the combination of feature maps may provide an embedding feature space. In some other embodiments, a latter or final feature map layer may be an embedding feature space. Grad-CAM methods may utilize gradient information flowing into a last convolutional layer of the CNN to assign importance values to neurons for a particular decision of interest [18]. To generate a class-discriminative localization map Grad-CAM $L_{Grad-CAM}^c \in \mathbb{R}^{u \times v}$ of width u and height v for any class c, systems may compute the gradient of the score for class c, $y^c$ (before the softmax), with respect to feature map activations $A^k$ of a convolutional layer:

$$\frac{\partial y^c}{\partial A^k},$$

in which k is a channel index.

The gradients flowing back may be global-average-pooled over width and height dimensions (indexed by i and j respectively) to obtain the neural importance weights:

$$\alpha_k^c = \overbrace{\frac{1}{Z}\sum_i\sum_j}^{global\ average\ pooling} \underbrace{\frac{\partial y^c}{\partial A_{ij}^k}}_{gradients\ via\ backprop},$$

where (i, j) may be the spatial index and Z may be the special resolution of the feature map. The above-described neural importance weights may be grad-weights or gradient weights. During computation of the neural importance weights while back propagating gradients with respect to activations, computation amounts to successive matrix products of the weight matrices and the gradient with respect to activation functions until the final convolution lawyer that the gradients are being propagated to. The weight $\alpha_k^c$ may represent a partial linearization of the deep network downstream from A, and may capture the 'importance' of feature map k for a target class c.

As described above, Grad-CAM may be a weighted sum of feature maps providing a coarse heat map of a similar size as the convolutional feature maps:

$$L^c_{Grad-CAM} = ReLU\ \underbrace{\left(\sum_k \alpha_k^c A^k\right)}_{linear\ combination}.$$

In some embodiments, a Rectified Linear Unit (ReLU) may be applied to the linear combination of feature maps at least because the features having a positive influence on the class of interest may be required (e.g., pixel intensity to be increased in order to increase $y^c$. In some scenarios, negative pixels may be associated with other categories for the image. Without the ReLU operation, the heat maps or localization maps may highlight more regions than the desired class, thereby providing undesired or unexpected visual annotations. In some scenarios, $y^c$ may not be a class score generated by an image classification CNN; it may be a differentiable activation, such as words from a caption or answer to a query.

The above-described embodiment of the embedding network 302 may be pre-trained while "off-line", and may be configured to generate plurality of embedding/grad-weights for storage at a data store 308.

Upon pre-training of the embedding network 302, the system 300 may include operations for receiving test images or input images 304, which may include a query. To illustrate, the input image 304 may be received with a query: "What type of bird is shown in the photo?".

The system 300 may receive the input image 304 at a convolutional neural network 306 and may determine feature embeddings based on the input image 304. The system 300 may also determine feature maps associated with the received input image 304.

Based on the determined feature embeddings, the system 300 may query embedding grad-weights stored at a data store 308 based on the prior-trained embedding network 302 based similar feature embeddings, and determine embedding grad-weights associated with the similar feature embeddings. The system 300 may generate a visually annotated image 312, which includes visual annotations overlaid on the input image 304 for highlighting regions or distinct features depicted in the image that may be pertinent to a query response.

In some embodiments, the system 300 may query embedding grad-weights based on nearest neighbor search operations in an embedding feature space, such that the obtained grad-weights are associated with feature embeddings in the feature space that are similar to feature embeddings of the obtained input image 304. That is, when a training image from training of the triplet embedding network 302 may be determined to be similar (e.g., close in a feature embedding space) with that of the obtained input image 304, the images may be identified to have similar semantic attributes. For example, for two birds having similar colored/patterned heads: if attributes (red head pixels) are activated by convolutional kernels (e.g., top-weight channels) in training data set examples, the convolutional kernels may be activated by the same attributes in testing data set images.

Embodiments described with reference to FIG. 3 may adapt operations of the Grad-CAM method for generating embedding/grad-weights based on a training data set. During testing, the system 300 may query embeddings/grad-weights based on nearest neighbour searches in the feature embedding space and provide grad-weights for generating visual annotations on an input image for highlighting regions or features in the input image that may be pertinent to providing an explanation of a query response. In some embodiments of the system 300, operations for testing an input image 304 to generate visually annotated images 312 may be conducted without back propagation. In some embodiments, the obtained embedding/grad-weights may be associated with hidden states of an image.

In some scenarios, directly applying grad-CAM to embedding networks may include two technical challenges. First, embedding networks may not provide per-class scores in training/testing. Distances between examples may be differentiable, but it may not be clear how to use them. Second, it may not be possible to compute gradients for a single image in testing because the testing image has neither labels nor paired images. Even if "fake" triplets are made based on multiple training/testing images, how to create valid triplets may not be clear because of no labels. These challenges may not be solved by trivial solutions at least because of differences between classification-based networks and embedding networks.

Some embodiments of the present disclosure may address one or more of the above-described challenges by sampling multiple triplets from the training set. With a prior-trained network, operations may include checking if a triplet is valid (i.e. non-zero loss) on the training set. When example operations use multiple valid triplets in which the anchor image is always the same, the loss may include useful information about the visual attention in the anchor image. For example, some parts of the image may be consistently activated. Based on this analysis, multiple triplets may produce reliable visual attention.

To adapt the Grad-CAM method, a per-class gradient may be modified to provide:

$$g(A^k) = \frac{\partial \mathcal{L}_{tri}}{\partial A^k}. \tag{5}$$

In some embodiments, the class score may be replaced with triplet loss on the basis that the triplet loss data may include similarity information of anchor/positive and anchor/negative pairs. Thus, embodiments disclosed herein may generate grad-weights for an anchor image:

$$\alpha_k = \frac{1}{Z} \sum_i \sum_j \frac{\mathcal{L}_{tri}}{\partial A^k_{i,j}}. \tag{6}$$

Because the embedding network may be trained from numerous data set triplets, the loss from one triplet, in general, may not be representative all data set triplets. Accordingly, generated grad-weights based on one data set triplet may not be suitable in all scenarios.

In some embodiments, it may be beneficial to provide systems configured to sample numerous triplets and average the grad-weights associated with the numerous triplets:

$$\alpha_k = \frac{1}{N_s} \sum_i \alpha_k^i, \tag{7}$$

in which $N_s$ is the number of sampled triplets. By averaging the grad-weights, systems may generate explainability annotations that are more stable as compared to when grad-weights may be generated based on one data set triplet. Features of the above-described embodiments may be based on the consistent attention model in [25].

Figure 4B:
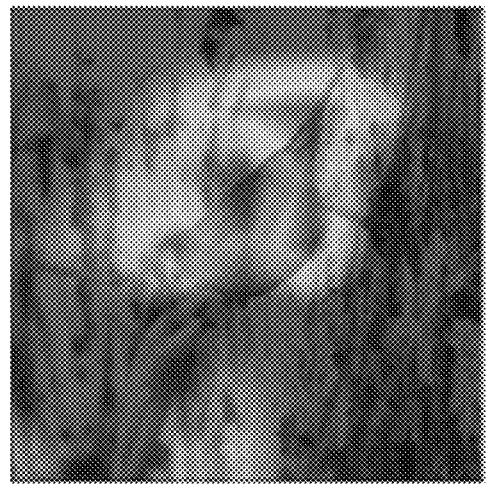
FIGS. 4A, 4B, 5A, and 5B illustrate photos having visual indications overlaid thereon, in accordance with embodiments of the present disclosure.
Figure 4B:
Figure 4A:
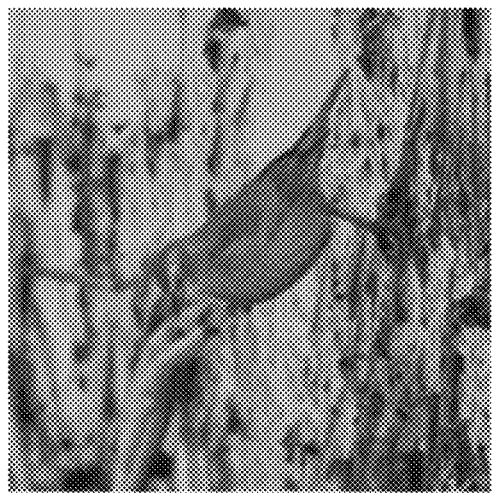
Figure 4A:
Figure 5A:
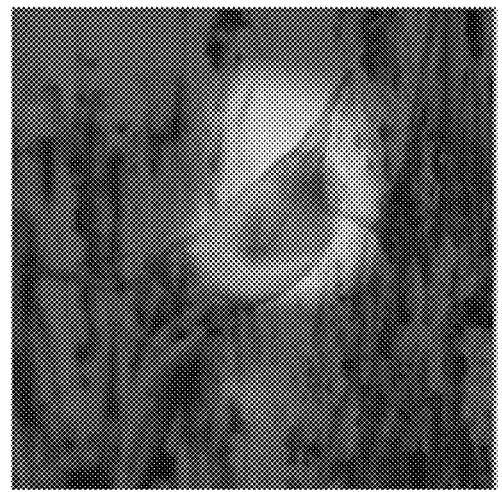
Figure 5A:
Figure 5B:
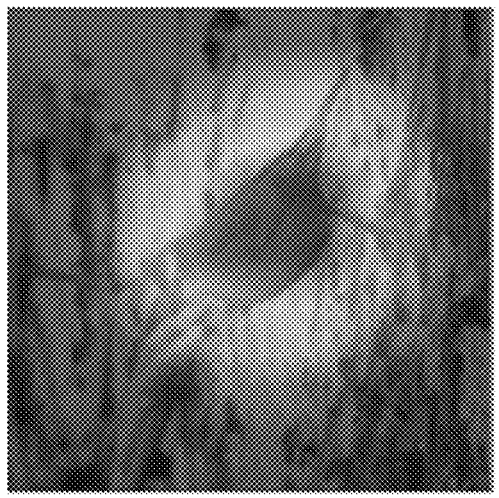
Figure 5B:

Reference is made to FIGS. 4A, 4B, 5A, and 5B, which illustrates photos having visual indications associated with portions of images that were most influential for a neural network process, in accordance with embodiments of the present disclosure. FIG. 4(A) illustrates a set of testing images 400A. FIG. 4(B) illustrates the testing images having visual indications overlaid thereon based on Grad-CAM operations trained by a single triplet of a training data set. FIG. 5(A) illustrates the testing images having visual indications overlaid thereon based on Grad-CAM from 50 triplets of a training data set based on all weights. FIG. 5(B) illustrates the testing images having visual indications overlaid thereon based on Grad-CAM from 50 triplets based on top-weights.

FIG. 4(B) and FIG. 5(A) illustrate two examples of testing images based on Grad-CAM using one triplet and 50 triplets, respectively, for generating visual indications associated with portions of images that were most influential for a neural network process. Grad-CAM based on 50 triplets (see FIG. 5(A), top row) provide relatively more stable results.

Grad-weights based on multiple triplets may provide more stable visual attention than those from one triplet. However, in some scenarios, grad-weights based on multiple triplets may not necessarily provide useful visual indication results (see e.g., FIG. 5(A), bottom row). Thus, in some embodiments, systems may be configured to conduct operations based on top-weights. Example operations may include sorting weights of respective channels and selecting/using M channels with the highest weight values (e.g., top-weights).

FIG. 5(B) illustrates the testing images from FIG. 4(A) having visual indications overlaid thereon based on operations associated with above-described top-weights. Embodiment systems configured to conduct operations based on top-weights may generate visual indications associated with features of testing images with greater consistency (see e.g., FIG. 5(B)) as compared to operations based on all channel weights (see e.g., FIG. 5(A)). In some scenarios, utilizing top-weights may yield greater consistency when identifying features at least because low-value weights may be associated with noise signals in embeddings.

In some embodiments, the systems and methods described herein may conduct operations based on top-weights for numerous training data set images, and may generate an embedding/grad-weights database that may be used for testing images.

In some embodiments, systems disclosed herein may obtain grad-weights generated based on training data set images for generating explanatory visualizations to highlight portions/features of testing images that were influential for a machine learning output process. When a training image and a testing image may be similar or proximally close in a feature embedding space, the training image and the testing image may have similar semantic attributes. To illustrate, two birds may have similar colored heads. If attributes (e.g., red pixels associated with a bird's head) is activated by convolutional kernels of a convolutional neural network (e.g., to-weight channels) during training, these convolutional kernels may also be activated by similar attributes identified in the testing image.

Continuing with the above example, embodiment systems may obtain a testing image and determine feature embeddings for the testing image. The systems may determine, based on a nearest neighbor search of similar feature embeddings of one or more training images, grad-weights based on training images having similar feature embeddings as the testing image. The systems may generate, based on grad-weights of the nearest neighbor feature embeddings, explanatory visualizations for the testing image, thereby providing explanatory visualizations without back propagation operations.

Figure 6:
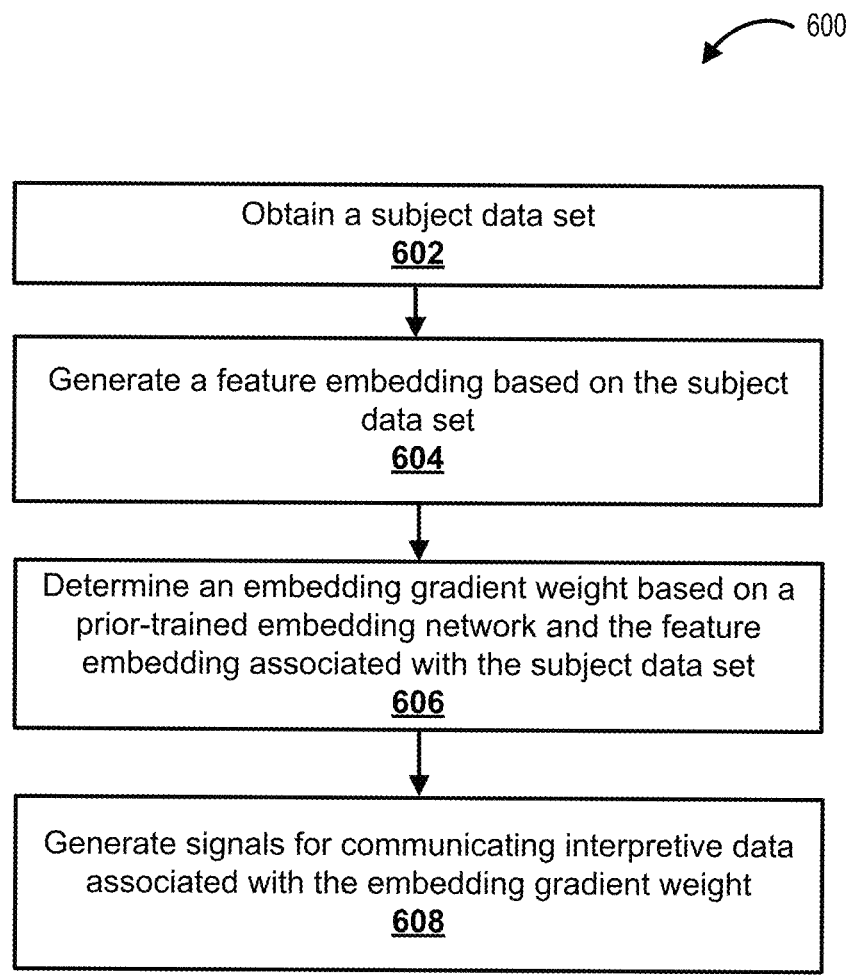
FIG. 6 illustrates a method for machine learning architecture to generate interpretive data associated with data sets, in accordance with embodiments of the present disclosure.

Reference is made to FIG. 6, which illustrates a flowchart of a method 600 for machine learning architecture to generate interpretive data associated with data sets, in accordance with embodiments of the present disclosure. The method 600 may be conducted by the processor 102 of the system 100 (FIG. 1). Processor-executable instructions may be stored in the memory 106 and may be associated with the machine learning application 112 or other processor-executable applications not illustrated in FIG. 1. The method 600 may include operations, such as data retrievals, data manipulations, data storage, or other operations, and may include computer-executable operations.

Numerous examples described herein may be directed to generating visual interpretation data based on obtained input image data. It may be appreciated that embodiments of the present disclosure may also be implemented for providing explanation or interpretation data for non-image data.

At operation 602, the processor may obtain a subject data set. The subject data set may be testing data set obtained from the client device 110 or the data store 114 (FIG. 1). In some embodiments, the subject data set may be image data, non-image data, or a combination thereof.

As non-limiting examples in the context of banking institution systems, non-image data sets may include database records or data structures storing banking customer records, transaction records, graphical user interface interaction data (e.g., mouse click data, web page scrolling data, etc. associated with a customer using a banking institution's website), acoustic signals (e.g., voice recordings, etc.), among other examples.

In some embodiments, the processor may obtain the subject data set from the client device 110, where the client device 110 may transmit a query associated with the subject data set. For example, the client 110 may transmit one or more image data files with associated queries, such as "what species of bird is illustrated in the photo?" or "what is the estimated value of the house depicted in the photo?"

In some scenarios, it may be beneficial to generate a response to the query in combination with annotations for explaining or interpreting the response. For example, in response to the query "what species of bird is illustrated in the photo?", it may be beneficial to provide visual annotations of the obtained image data file to illustrate what features or what portions of the image were regarded as pertinent to generating the response to the query. In some scenarios, the explanation or interpretation data may be beneficial for troubleshooting/debugging training datasets or machine learning operations, identifying bias among machine learning operations, determining feature relevance associated with obtained input data sets, or providing a user of the system data for understanding relevance or accuracy of a provided machine learning output (e.g., prediction).

At operation 604, the processor may generate a feature embedding based on the subject data set. In some embodiments, a feature embedding may include a mapping of a discrete, categorical, variable to a vector representation. For example, feature embeddings may be low-dimensional learned continuous vector representations of discrete variables, and may be beneficial for representing the subject data set in a feature space (e.g., a transformed space). As disclosed herein, based on feature embeddings, the processor may identify nearest neighbors in an embedding feature space to identify other data sets that may have similar features or attributes.

At operation 606, the processor may determine an embedding gradient weight based on a prior-trained embedding network and the feature embedding associated with the subject data set. The prior-trained embedding network may be defined based on a plurality of embedding gradient weights respectively corresponding to a feature map generated based on a plurality of training samples. The embedding gradient weight may be determined based on spatially querying a feature space associated with a plurality of feature maps for the feature embedding associated with the subject data set.

The processor at operation 606 may conduct a nearest neighbor search to identify embedding grad-weights that may be associated with feature embeddings having similarities to the feature embedding (identified at operation 604) associated with the subject data set. Attributes (e.g., pixels associated with a trunk portion of a birch tree) that may be activated by convolutional kernels of an example CNN in training datasets may correspond to activated convolutional kernels corresponding to similar attributes in a testing or subject data set (e.g., obtained at operation 602). Accordingly, the processor may transfer embedding grad-weights associated with training images corresponding to specific attributes for generating an interpretation data set to provide explanation or interpretation data.

As disclosed in the description with reference to FIG. 3, in some embodiments, the plurality of embedding gradient weights may be based on back propagated loss data associated with triplet training samples of a triplet embedding network. The triplet network may include three shared-weights branches (CNNs) and may retrieve as input an anchor data set, a positive data set, and a negative data set. During training, the triplet network may be configured to penalize triplets violating the rank constraint, such as requiring that the distance between the anchor data set and the positive data set be smaller than the distance between the anchor data set and the negative data set in the feature embedding space. In some embodiments, loss data may be formulated as:

$$\mathcal{L}_{tri}(a,p,n)=[D(f_a,f_p)-D(f_a,f_n)+\delta]_+,$$

where f denotes an embedding vector, D(•) is a squared Euclidean distance, δ is a margin, and [•]$_+$ is a hinge function. In some embodiments, embedding vectors may be L$_2$ normalized.

In some embodiments, the processor at operation 606 may identify the embedding gradient weight based on a nearest neighbor search of the feature embedding associated subject data in a feature space associated with the prior-trained embedding network 302 (FIG. 3).

In some scenarios, the pre-trained embedding network 302 (FIG. 3) may be trained based on multiple valid triples, such that loss data may be associated with useful information for highlighting attributes of an anchor image file. In some embodiments, the plurality of embedding gradient weights may be based on average gradient weights of a plurality of sampled triples.

In some embodiments, to increase stability of generating interpretation data sets, the plurality of embedding gradient weights may be based on top-weights of gradient weights determined from the plurality of sampled triples. As a non-limiting example, weights may be associated with channels or features associated with embedding feature spaces. The processor may conduct operations to sort channels according to weights and apply thresholds for identifying top-weights. In an example of image pixels being represented by channels, top-weights may be associated with pixels that may have pertinent or heightened importance in an image.

The processor may generate an interpretive data set for the subject data set based on the embedding gradient weight that was identified at operation 606. The interpretation data set or interpretive data set may be based on: (i) the transferred embedding gradient weights; and (ii) feature maps based on the subject data set. The feature maps may be based on operations of the convolutional neural network.

In examples where the subject data set is image data, the interpretation data set may include visual indication data for generating heat maps for overlaying on image data. As an example, the interpretation data set may provide a heat map for highlighting features of an image that may have been pertinent to a response to a query or to other neural network output associated with the subject data set. In some embodiments, the processor may generate the annotated image data having the heat map features overlaid thereon for transmission to the client device 110 (FIG. 1) or for storage at the data store 114 (FIG. 1).

In some embodiments, where the subject data set may be non-image data such as volumes of data records, audio data sets, among other examples, the interpretation data may include text or captions for identifying subset portions of the subject data set that may have been pertinent to providing a prediction or response to a query associated with the non-image data.

In examples where the subject data includes data record sets, such as customer records, transaction records, GUI interaction data, among other examples, the interpretation data may include metadata representing annotations or markers for identifying pertinent data in data records. To illustrate, identified pertinent data may include a combination data entries that identify "extended history of credit card statement payments in addition to data representing no delinquent payments in 6 months".

In examples where the subject data may include data structures storing graphical user interface (GUI) interaction data (e.g., mouse click data, web page scrolling data, etc.), the interpretation data may include metadata for identifying sequences of GUI interactions that may strongly infer a web page user's future intentions or requirements (e.g., combination of GUI interactions may infer that user requires multiple banking credit products in the near future).

In examples where the subject data may include data structures storing audio signals, the interpretation data may be associated with language or speech recognition output and the interpretation data may represent emotion recognition output. For example, the interpretation data associated with audio signals may provide context as to possible rationale behind recognized speech (e.g., speech recognition providing that user would like to close a banking account, and interpretation data may represent frustration based on obtained audio signals). Other examples of interpretation data associated with audio signals may be contemplated.

At operation 608, the processor may generate signals for communicating interpretive data associated with the embedding gradient weight. For example, in scenarios where the subject data set may be an image, the processor may transmit a visually annotated image to the client device 110 to supplement a response to a query. To illustrate, the image data may be a satellite image of a house and the image data may be associated with a query "what is the estimated property value of the house?" In some scenarios, the estimated property value of a house may be a function of attributes surrounding the house, such as whether the house is near greenspace, or whether the house is on a major street, or whether the house is in a densely populated neighborhood. In the present illustration, the interpretation data set may highlight portions of the satellite image that more heavily influenced the estimated property value of the house. For example, highlighting portions of an image may include overlaying a heat map having colours, overlaying image feature labels, drawing polygons on the image, among other examples.

In examples where the subject data set may be non-image data, communicating interpretive data associated with the embedding gradient weight may include associating the subject data set with metadata for highlighting aspects of data records that may be pertinent to a prediction output. For example, where the non-image data includes customer data records, communicating the interpretive data may include identifying and combining a subset of customer transaction data for collective display on a graphical user interface. In some embodiments, communicating interpretative data may include providing an output file, such as a file of comma separated values, among other examples, of the embedding gradient weights for parsing by a subsequent operation.

As embedding grad-weights may be transferred from operations of the prior-trained embedding network 302, operations for generating interpretation data set associated with testing/subject data sets may be provided without back propagation, and may be provided at least in part on feature embedding networks thereby addressing disadvantages of predominantly relying on discrete class labels or discrete categorizations.

Figure 7:
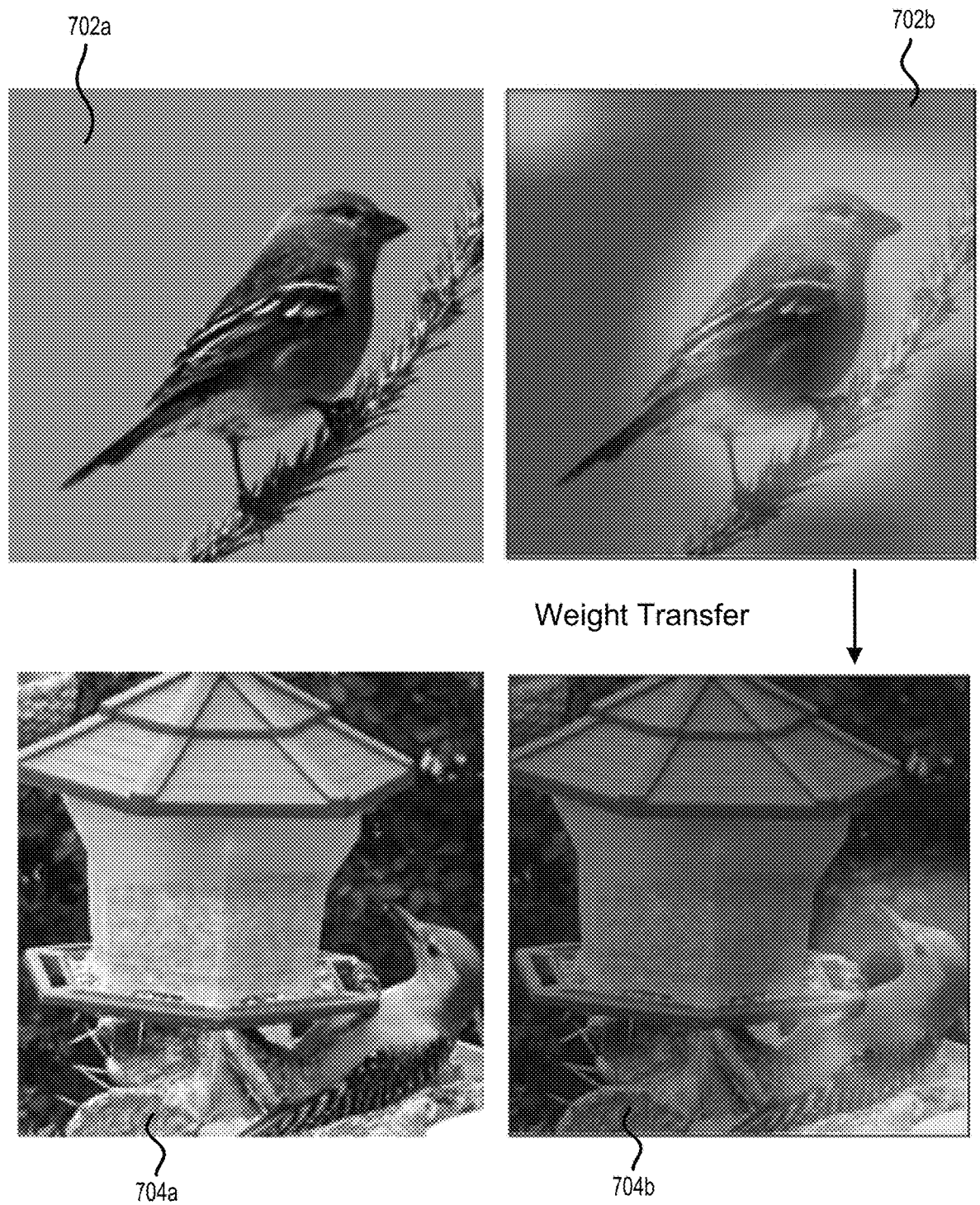
FIG. 7 illustrates example images based on a CUB200 data set, in accordance with embodiments of the present disclosure.

Reference is made to FIG. 7, which illustrates example images based on a CUB200 data set, in accordance with embodiments of the present disclosure. The example training image 702a may be a depiction of a bird having attributes including red features about the bird head. Based on operations of Grad-CAM, embedding grad-weights may be generated for identifying portions of a visually annotated image 702b on which particular attributes may be identified (e.g., red pixels associated with a bird head being associated with a bird species). Further, the embedding grad-weights may be transferred and overlaid on a testing image 704a to provide a visually annotated testing image 704b to identify corresponding attributes of a bird in the testing image 704a. In the illustrations in FIG. 7, the training image 702a and the testing image 704a may be associated with feature embeddings that are nearest neighbors in a feature embedding space. The testing image 704b may have an explanatory visualization overlaid thereon highlighting image pixels (e.g., head, neck and upper body) associated with differentiating the depicted bird from other species of birds.

To illustrate features of embodiments described in the present disclosure, benchmark experiment operations and results will be described.

In one benchmark experiment, a CUB200-2011 dataset [20] was used. The CUB200-2011 dataset [20] includes 11,800 bird images representing 200 species. Bird images associated with 100 species were identified as a part of a training data set. Bird images associated with the remaining species were used for testing operations.

Respective images were associated with a bounding box annotation of bird location. The dataset has been used as a standard benchmark for visual feature embedding [22] and network explanation [24]. In some examples, the original images may have different resolutions. The original images were scaled such that respective images have a shorter side of 256 pixels. The respective images were center cropped to 224×224. Systems were configured to train a resnet-50 embedding network with feature dimension 128 based on the disclosure of Wu et al. [22]. The retrieval performance of the network was recall@1 59.3%, which is considered competitive at the time of the experiments.

The experiments were set up based on a mean ratio of the Grad-CAM activation inside the bounding box as the visual attention accuracy metric. The metric was proposed by [17] to evaluate visual explanation for network decision. A higher score is associated with more neural activation is at the object (bird) or its close surroundings, indicating better visual attention.

In the conducted experiments, parameters were set as follows: triplet number $S_n$=50, top-weights channel number 50. The experiment results were compared with the following baselines:

Baseline 1 (Uniform-A): In this baseline, pixels may have uniform activation. The baseline may provide the lower bound of the score. This method may be denoted as Uniform-A at least because activation may be uniformly distributed in the image.

Baseline 2 (Grad-CAM): In this baseline, the grad-CAM method is adapted to embedding networks as described herein. It may have two variations. The first variation may use grad-weights from one triplet. The second variation may use averaged grad-weights from 50 triplets. Both of them may use all channels. The methods may be denoted as Grad-CAM-S and Grad-CAM-Avg, respectively.

Table 1 (below) illustrates the visual attention accuracy based on testing with the CUB200 data set. Embodiments of the systems and methods described in the present application achieved the highest accuracy on both training and testing sets with large margins with the second best. Moreover, the accuracy of the training and testing set was very close (0.763 vs. 0.760), which may indicate a good generalization ability of our weight transfer technique.

Referring to Table 1, the accuracy may be measured by the mean ratio of Grad-CAM activation inside the bounding box. The highest score is highlighted in bold font.

TABLE 1

| Dataset | Visual attention accuracy | | | |
| --- | --- | --- | --- | --- |
| | Uniform-A | Grad-CAM-S | Grad-CAM-Avg | Top-weights |
| Train | 0.567 | 0.649 | 0.638 | 0.763 |
| Test | 0.543 | 0.612 | 0.646 | 0.760 |

Figure 8:
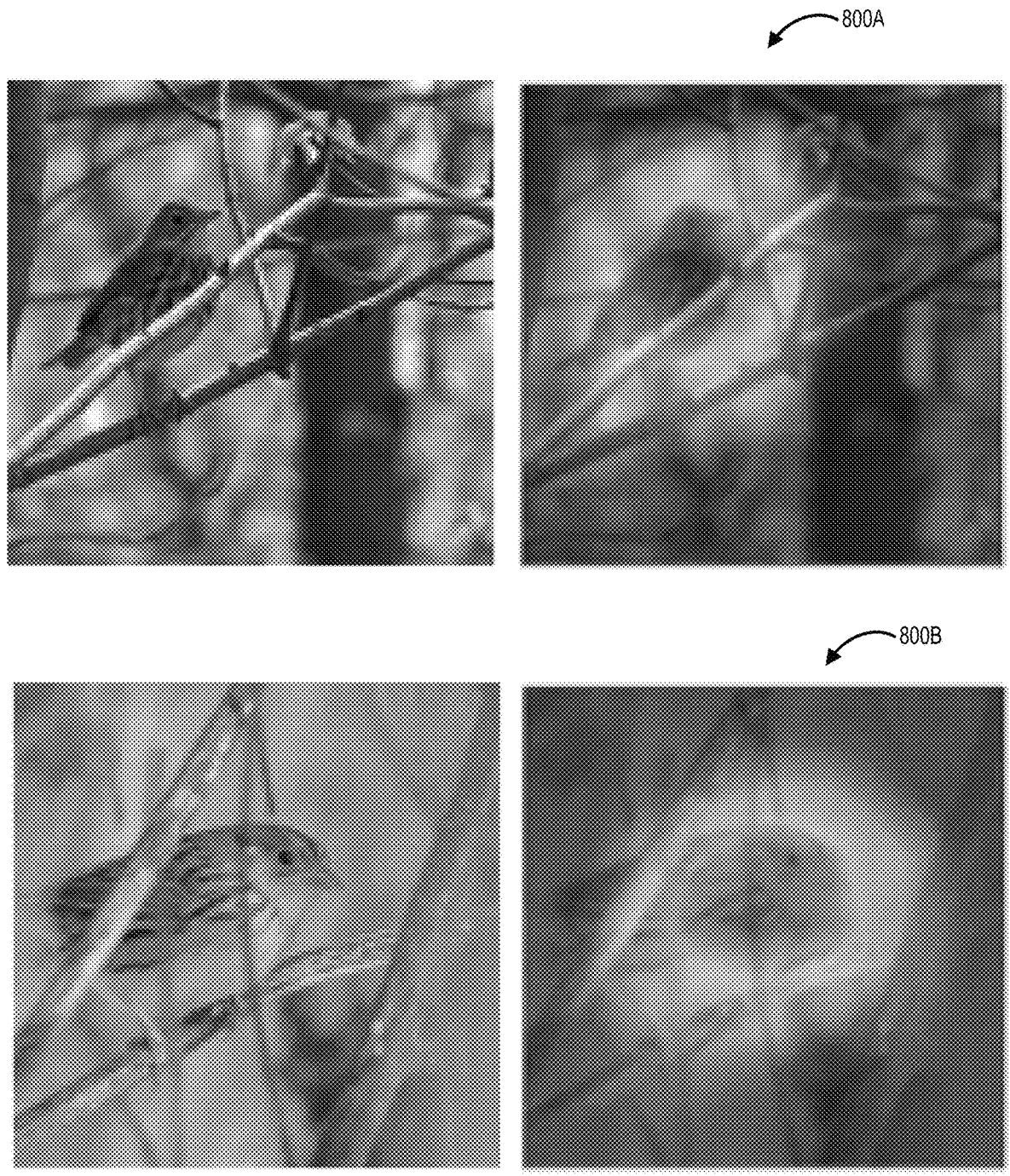
FIG. 8 illustrates visual indications highlighting influential features or regions of images of a CUB 200 data set, in accordance with embodiments of the present disclosure.

Reference is made to FIG. 8, which illustrates visual indications highlighting influential features or regions of images of a CUB200 data set, in accordance with embodiments of the present disclosure. In FIG. 8, a training image set 800A is illustrated an upper side of the page and a testing image set 800B is illustrated on a lower side of the page. In the illustrated example, embedding grad-weights associated with the testing image are transferred such that an embodiment system may generate a visual annotation of the testing image set 800B highlighting portions of the bird (e.g., head, beak, or neck) that may be pertinent in distinguishing the bird from other species of birds. The visual annotation may include a heat map for identifying particular features pertinent to prediction or a query associated with the image.

Figure 9:
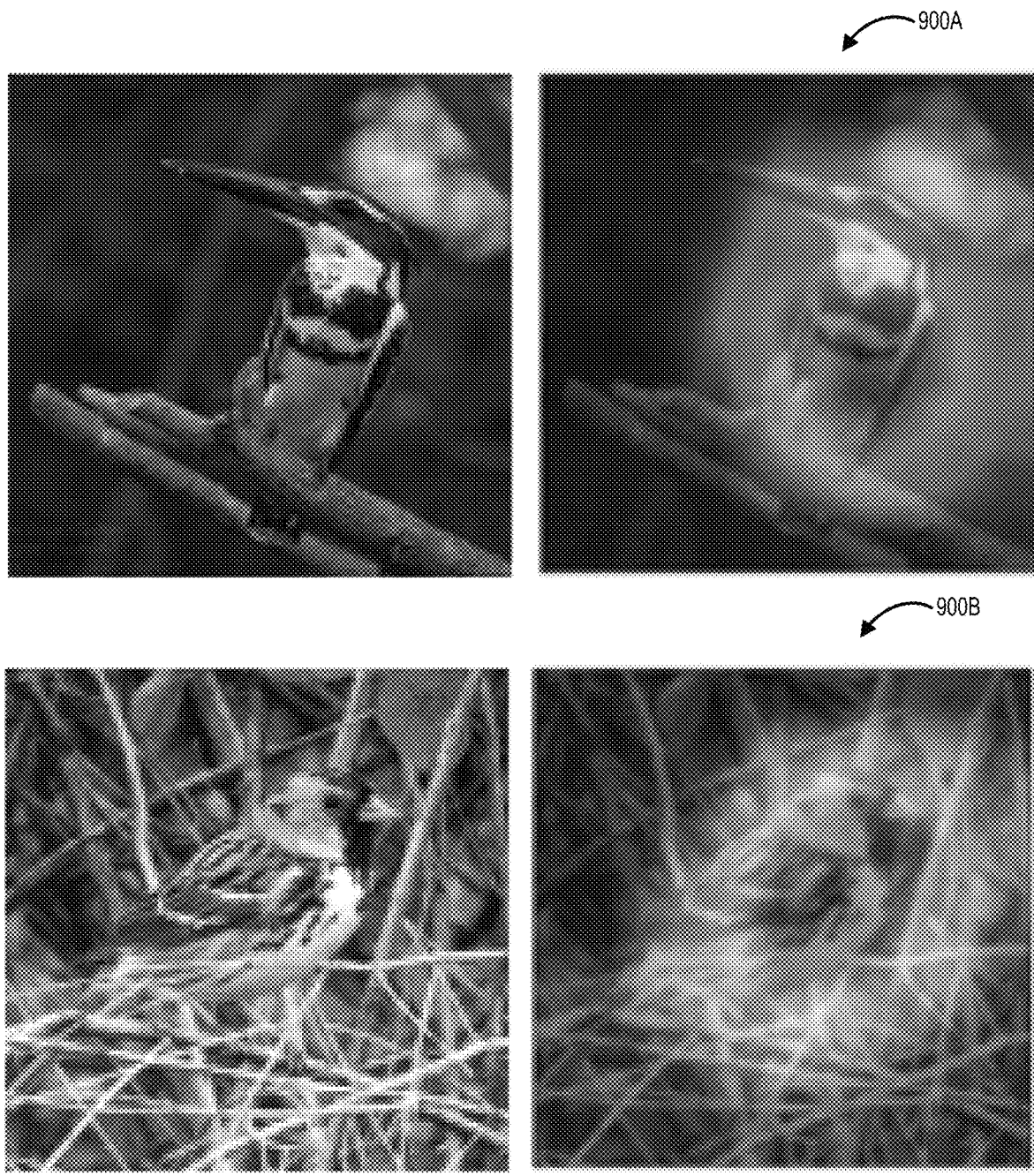
FIGS. 9, 10, and 11 illustrate training image sets and testing image sets, in accordance with embodiments of the present disclosure.
Figure 10:
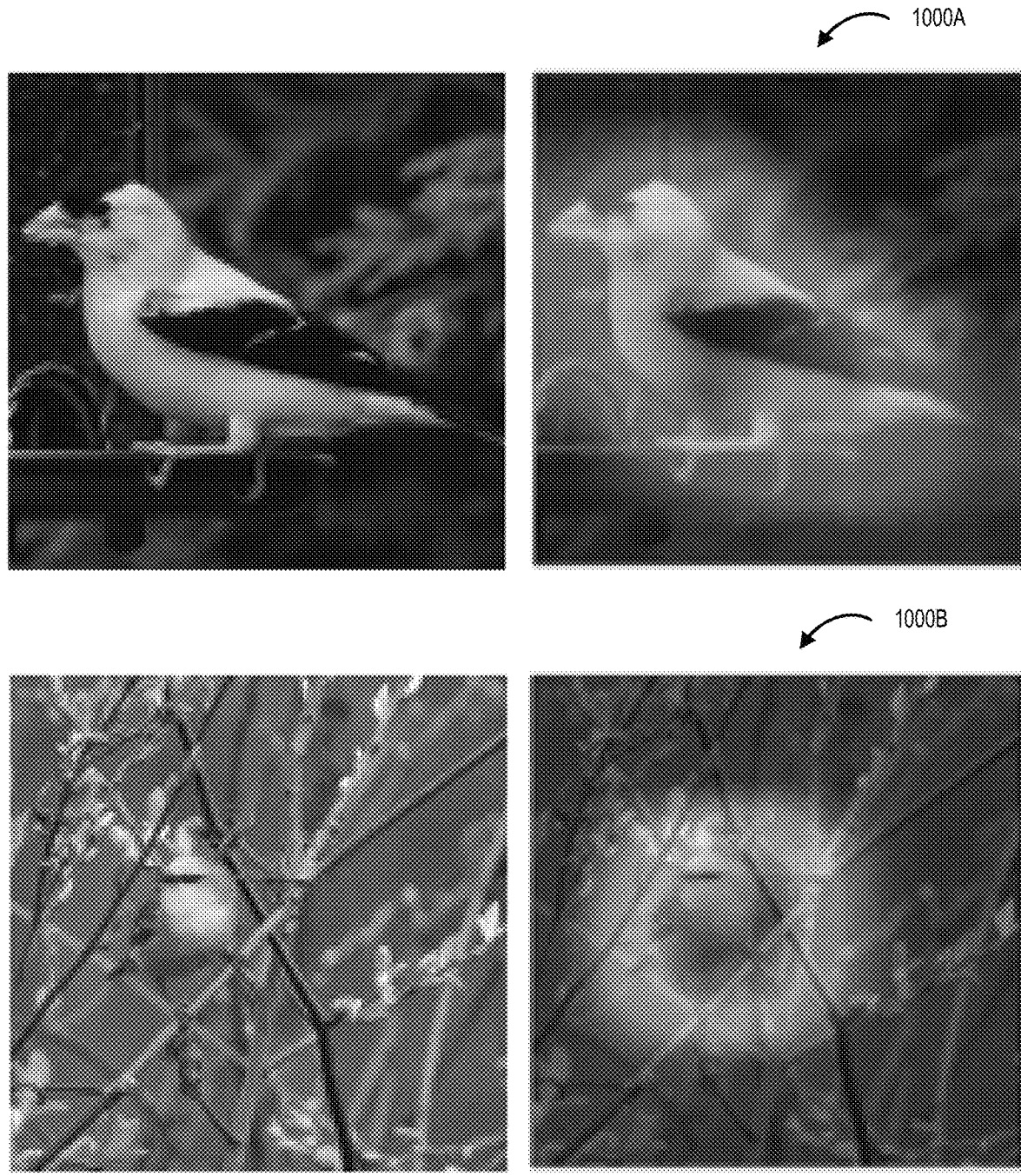

FIG. 9 illustrates another example of a training image set 900A and a testing image set 900B. FIG. 10 illustrates another example of a training image set 1000A and a testing image set 1000B. In FIGS. 9 and 10, visual annotations in the respective testing image sets may be based on embedding grad-weights transferred based on the training image sets.

Figure 11:
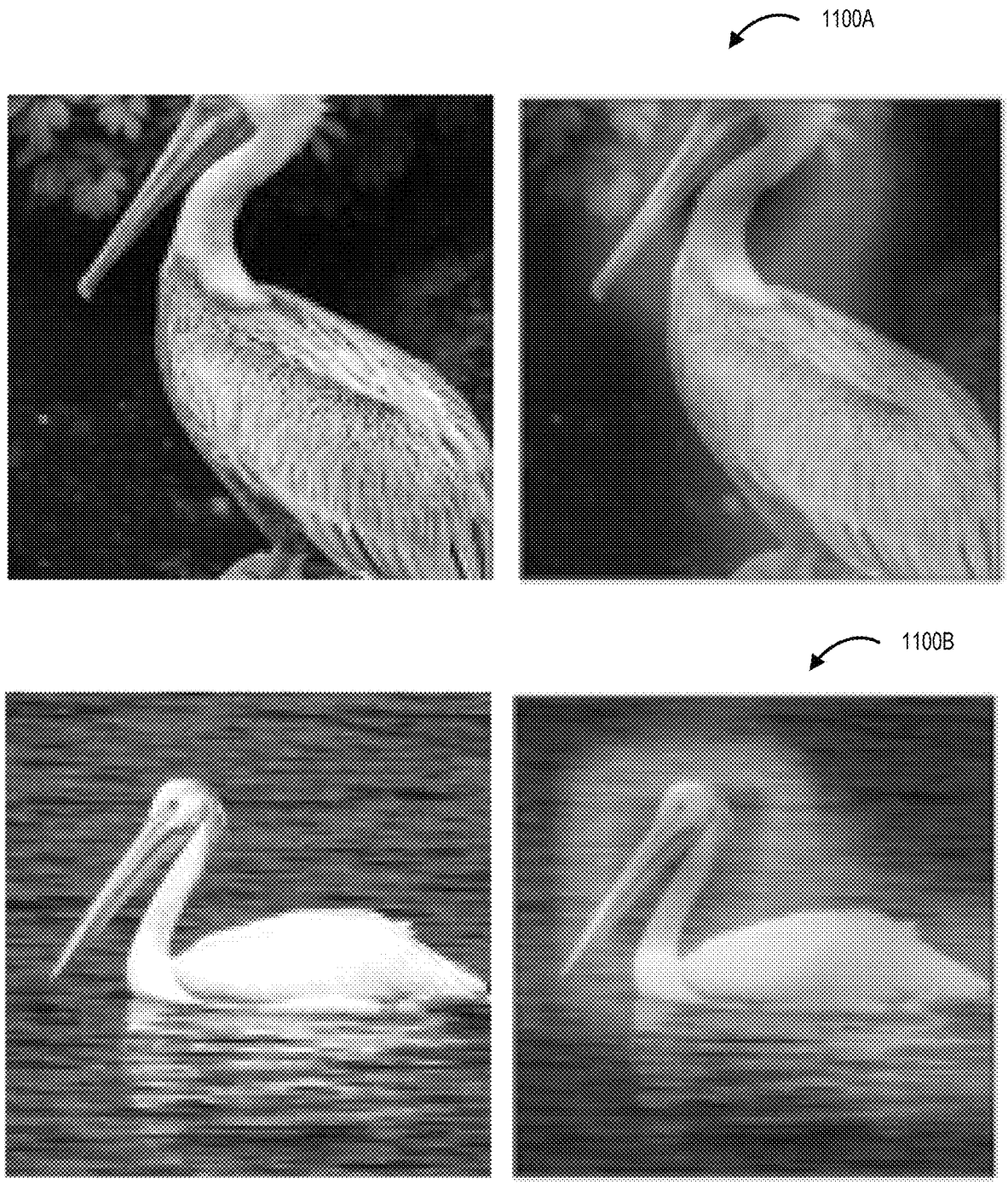

FIG. 11 illustrates another example of a training image set 1100A and a testing image set 1100B. In the illustration of FIG. 11, operations of embodiment systems disclosed herein may generate visual annotations to highlight pertinent regions for distinguish the depicted bird from birds of other species. The testing image set 1100B includes visual annotations identifying the beak and the neck of the bird as anatomical features that may distinguish the bird from birds of other species.

As another example, embodiment systems and methods described herein may be configured to provide explanations or interpretations of real estate (e.g., house) price estimations. Quantitative attributes and visual features may be used to predict or estimate house prices. To explain prediction results, the system and method may generate visualization maps of visual features based on satellite images. Details of an experiment to illustrate the system and method of explaining real estate price estimation are described below.

Dataset and metric: Approximately 200,000 property examples located in the Greater Toronto Area (about 7000 km$^2$) in Canada were collected. The price is the sold price from January 2017 to April 2019. Each example property included about 40 attributes (e.g. geo-location and bedroom numbers) and a sold price. The data set was labelled the GTA-sold data set.

To reduce noise, the raw data was pre-processed. For example, pre-processing operations removed property data that included: (1) repeated examples; (2) had very low or high prices; and/or (3) had very high missing attributes. Because the experiment was focused on house type properties (i.e. house, town-house and semi-detached), other types of property data were removed from the experiment data set (Note: in one experiment, a network was trained based on resnet50 and visual attention accuracy was approximately 95%). After processing, the data set included approximately 54,000 entries. The data set entries were organized by date/time and divided according to a training/testing ratio of 6:4.

Figure 12B:
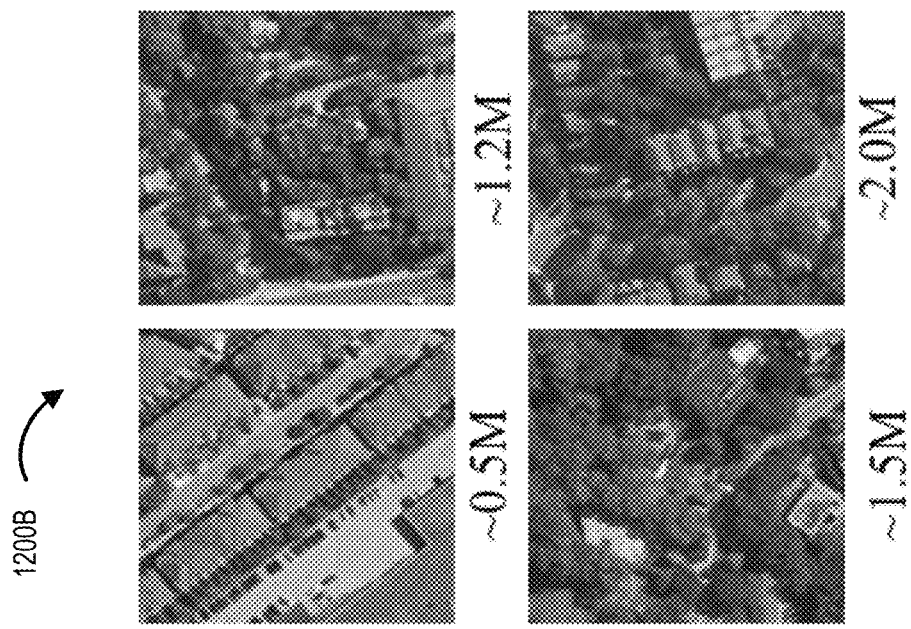
FIG. 12A illustrates a map illustrating a geographical distribution of a training data set and FIG. 12B illustrates satellite images associated with house properties, in accordance with embodiments of the present disclosure.
Figure 12A:
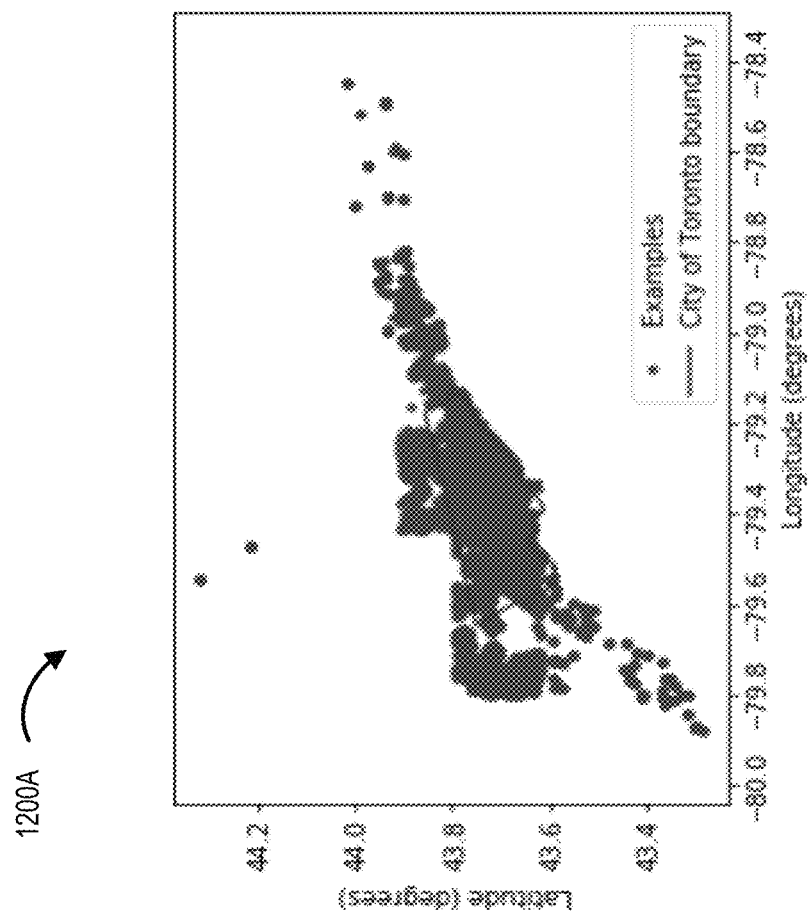

FIG. 12A illustrates a map 1200A illustrating the geographical distribution of the data set entries for the training example. For respective data set examples, one or more corresponding satellite images were captured using the Google™ Maps application programming interface (API). The API provided multi-scale satellite images centered at a specified longitude and latitude coordinate. Images were captured with a zoom level setting of 18, such that captured images provided relatively high resolution of a target house and surrounding neighborhood environment.

FIG. 12B illustrates several satellite images 1200B associated with house properties and corresponding property price examples. In the satellite images, the subject house is roughly centered in the image window.

To evaluate prediction accuracy, experiments utilized a 10% maximum error accuracy as the performance metric. Using this metric, a given prediction was identified as correct if a predicted price is within the ±10% of the actual selling price. Because the experimental data set of the present example did not have a bounding box annotation of the objects in the images, the presently described experiment only provided qualitative results for visualization evaluation.

Figure 13:
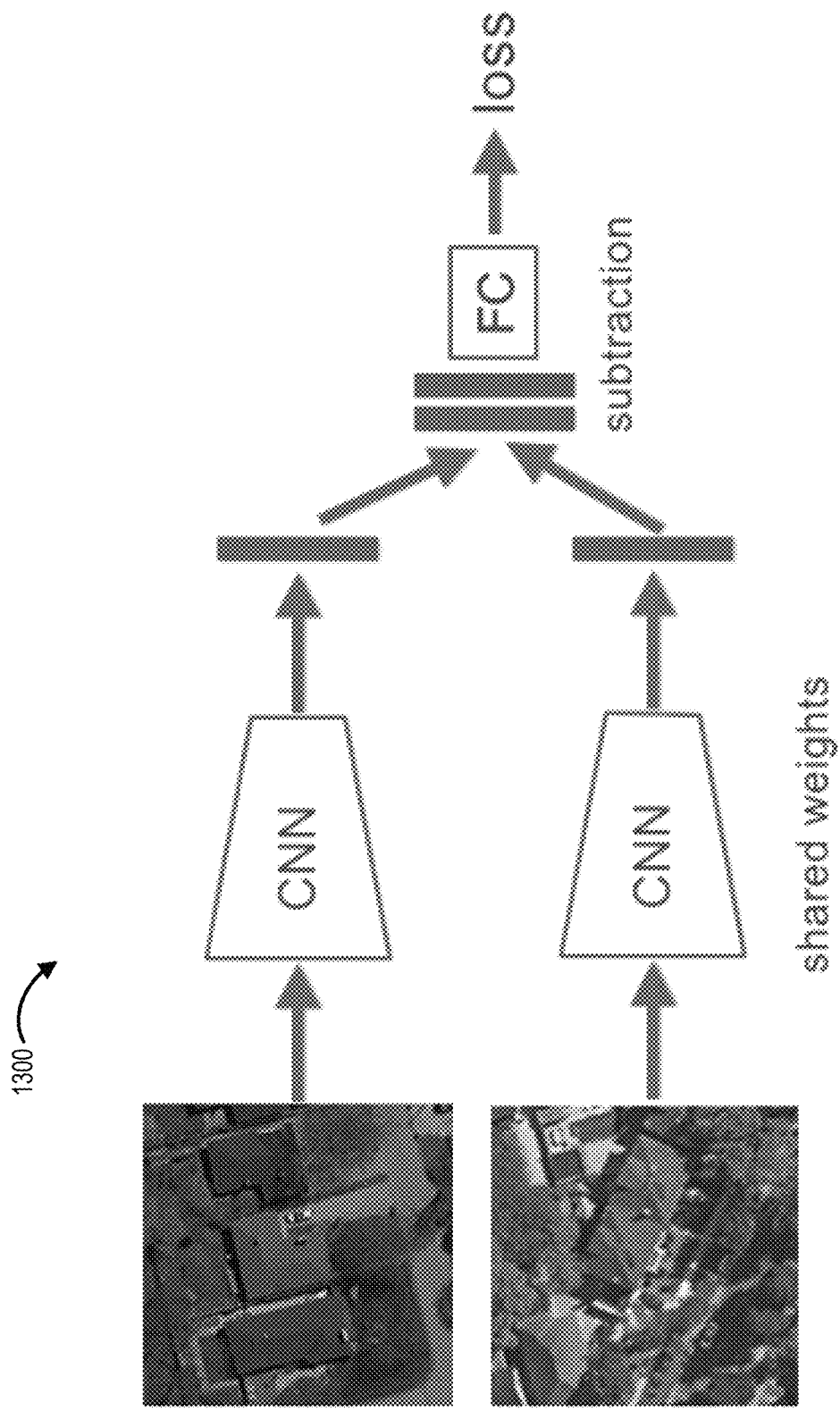
FIG. 13 illustrates a Siamese network, in accordance with embodiments of the present disclosure.

Network structure: The present example utilized a rank Siamese network [4] to learn features from paired examples. FIG. 13 illustrates an example Siamese network 1300. For paired examples $\{x_i, y_i\}$ and $\{x_j, y_j\}$, the network was trained to predict whether $y_i > y_j$. First, the operations utilized the branch CNN to extract features $f(x_i)$ and $f(x_j)$ from paired images. An element-wise difference vector $v_{ij} = f(x_i) \ominus f(x_j)$ was used and passed to a fully connected (FC) (4×2) layer before the cross entropy loss. In training, the operations utilized a resnet-50 (pre-trained on ImageNet) for the CNN branch and for fine-tuning its FC (2048×4) layer. The visual feature dimension was 4.

With price prediction, the house attributes included geographical location coordinates, number of bedrooms, number of bathrooms, sold time (year and month), and unit area. In the present example experiments, operations were conducted utilizing different combinations of house attributes with visual features. For different inputs, the operations trained different regression models, including random forests (RF), gradient boosting regression, support vector regression (SVR), and neural network regression. Gradient boosting regression provided the highest prediction accuracy most of the time, and gradient boosting regression was accordingly utilized.

Table 2 summarizes prediction accuracy on the testing set. When visual features were taken into account, prediction accuracy experienced consistent improvement among the different feature combinations. When all the other attributes were used, the improvement by visual feature is significant (4.5%). Further, the overall prediction accuracy was 55.2%, which was an encouraging result, as only a limited number of house attributes/features were considered. Table 2 illustrates a house price estimation accuracy, contrasting estimation accuracy when visual features (VF) were considered and also when visual features (VF) were not considered. The result with the highest accuracy is identified in bold font.

TABLE 2

| Attributes | Accuracy | | |
|---|---|---|---|
| | Without VF | With VF | Δ |
| No | — | 36.1 | |
| Geo-location | 37.8 | 39.9 | 2.1 |
| Geo-location, bedrooms, bathrooms | 47.1 | 50.1 | 3.0 |
| Geo-location, bedrooms, bathrooms, sold time | 42.6 | 50.6 | 8.0 |
| Geo-location, unit area | 48.3 | 48.7 | 0.4 |
| Geo-location, bedrooms, bathrooms, sold time, unit area | 50.7 | 55.2 | 4.5 |

Figure 14:
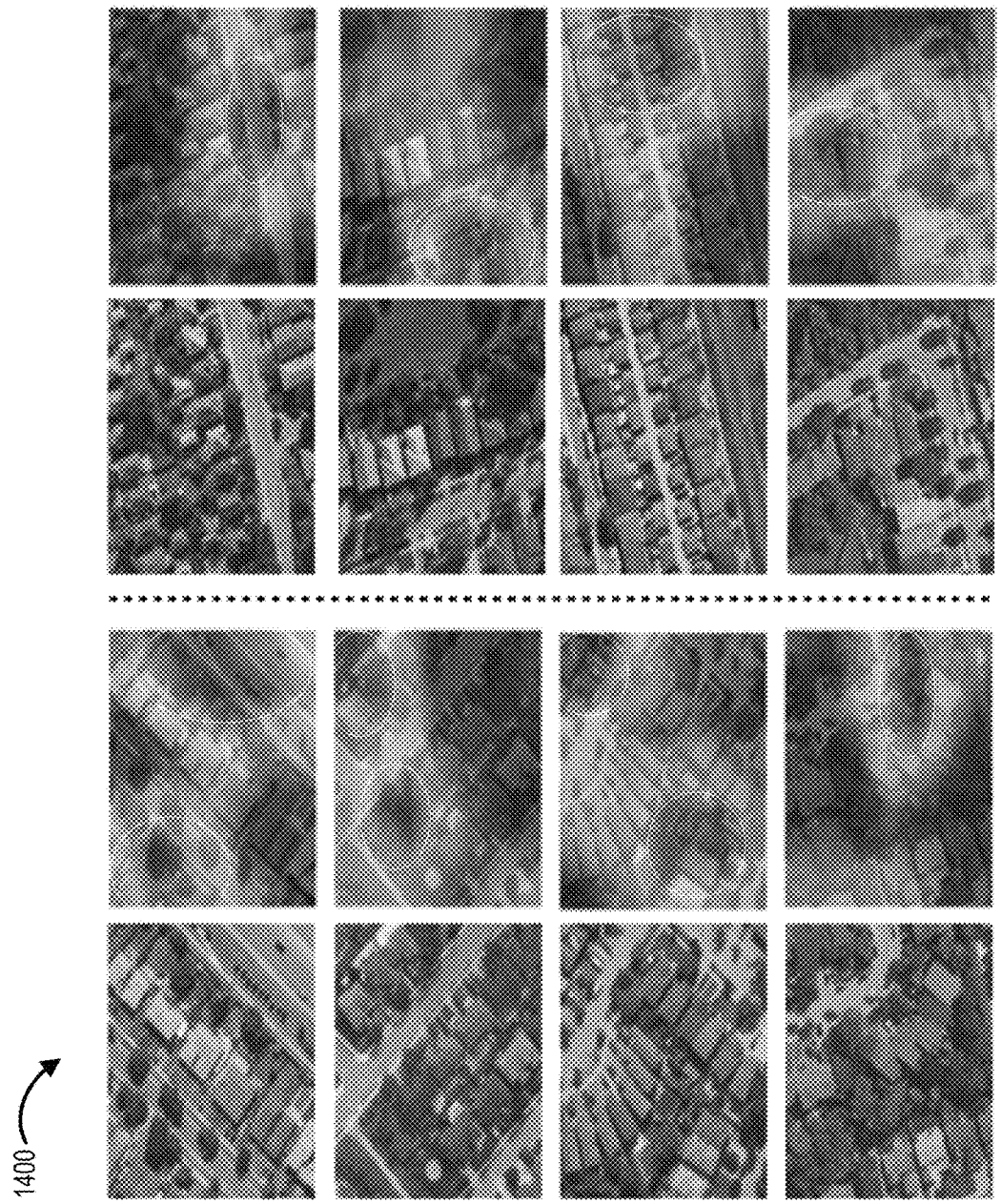
FIG. 14 illustrates a plurality of training and testing satellite image pairs, in accordance with embodiments of the present disclosure.

Reference is made to FIG. 14, which illustrates example image pairs 1400, in accordance with embodiments of the present disclosure. The images may be images of real estate/houses captured by satellite image capture devices. Images on a left side of the page represent a training data set, and images on a right side of the page represent a testing data set. In the respective rows, the embedding grad-weights used for generating the visual annotations were transferred (based on operations disclosed in embodiments of the present disclosure) from the respective training images.

The satellite image pairs 1400 illustrated in FIG. 14 may include visual annotations in the format of heat maps for identifying features of the satellite image considered by the systems to be pertinent to neural network output (e.g., predictions, etc.). For ease of exposition, supplemental annotations such as elliptical shapes are provided to indicate portions of the satellite images being highlighted.

To generate the annotated testing images, operations included utilizing the top-50 grad-weights that were averaged from 50 siamese examples. In the illustrations of FIG. 14, the visual indications predominantly highlighted house properties. In some of the images, the visual indications also highlighted roadways.

It may be appreciated that examples described herein provide qualitative visual indications of features, such as using color codes, overlaid shapes, or the like, at least, because satellite images may not provide object labels. It may be contemplated that data sets or images having object labels may be annotated with quantitative indications.

When comparing visualization results associated with the CUB200 data set and a data set associated with satellite images of house properties, the visual indications for satellite images of house properties appeared to be more diverse. In the present example, satellite images may include a plurality of objects, such as houses, roads, trees, swimming pools, etc., and a neural network may alter focus on particular objects throughout operations of numerous training data sets, thereby yielding changes in visual indications highlighting portions of images that most influenced, for example, a property price estimation.

Embodiments of systems and methods described herein include operations of a Grad-CAM adaptation method for embedding networks. The systems and methods may provide greater consistency when providing visual indications highlighting portions of an image that was most influential for a neural network process.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

REFERENCES

[1] L. Anne Hendricks, R. Hu, T. Darrell, and Z. Akata. Grounding visual explanations. In *European Conference on Computer Vision (ECCV)*, 2018.

[2] D. Bau, B. Zhou, A. Khosla, A. Oliva, and A. Torralba. Network dissection: Quantifying interpretability of deep visual representations. In *IEEE Conference on Computer Vision and Pattern Recognition (CVPR)*, 2017.

[3] A. J. Bency, S. Rallapalli, R. K. Ganti, M. Srivatsa, and B. Manjunath. Beyond spatial auto-regressive models: Predicting housing prices with satellite imagery. In *IEEE Winter Conference on Applications of Computer Vision (WACV)*, 2017.

[4] C. Burges, T. Shaked, E. Renshaw, A. Lazier, M. Deeds, N. Hamilton, and G. N. Hullender. Learning to rank using gradient descent. In *International Conference on Machine Learning (ICML)*, 2005.

[5] R. Chen, H. Chen, G. Huang, J. Ren, and Q. Zhang. Explaining neural networks semantically and quantitatively. *IEEE International Conference on Computer Vision (ICCV)*, 2019.

[6] A. Dosovitskiy and T. Brox. Inverting visual representations with convolutional networks. In *IEEE Conference on Computer Vision and Pattern Recognition (CVPR)*, 2016.

[7] Y. Jeong and H. O. Song. Efficient end-to-end learning for quantizable representations. In *International Conference on Machine Learning (ICML)*, 2018.

[8] S. Kim, M. Seo, I. Laptev, M. Cho, and S. Kwak. Deep metric learning beyond binary supervision. *In IEEE Conference on Computer Vision and Pattern Recognition (CVPR)*, 2019.

[9] P. W. Koh and P. Liang. Understanding black-box predictions via influence functions. In *International Conference on Machine Learning (ICML)*, 2017.

[10] S. Law, B. Paige, and C. Russell. Take a look around: using street view and satellite images to estimate house prices. In *International Workshop on Urban Computing (UrbComp 2018)*, 2018.

[11] C. Liu, J. Yuen, and A. Torralba. SIFT flow: Dense correspondence across scenes and its applications. *IEEE Transactions on Pattern Analysis and Machine Intelligence (PAMI)*, 33(5):978-994, 2010.

[12] S. M. Lundberg and S.-I. Lee. A unified approach to interpreting model predictions. In *Advances in Neural Information Processing Systems (NIPS)*, 2017.

[13] H. Oh Song, Y. Xiang, S. Jegelka, and S. Savarese. Deep metric learning via lifted structured feature embedding. In *IEEE Conference on Computer Vision and Pattern Recognition (CVPR)*, 2016.

[14] 0. Poursaeed, T. Matera, and S. Belongie. Vision-based real estate price estimation. *Machine Vision and Applications (MVA)*, 29(4):667-676, 2018.

[15] A. Sanakoyeu, V. Tschernezki, U. Buchler, and B. Ommer. Divide and conquer the embedding space for metric learning. In *IEEE Conference on Computer Vision and Pattern Recognition (CVPR)*, 2019.

[16] F. Schroff, D. Kalenichenko, and J. Philbin. FaceNet: A unified embedding for face recognition and clustering. In *IEEE Conference on Computer Vision and Pattern Recognition (CVPR)*, 2015.

[17] R. R. Selvaraju, P. Chattopadhyay, M. Elhoseiny, T. Sharma, D. Batra, D. Parikh, and S. Lee. Choose your neuron: Incorporating domain knowledge through neuron-importance. In *European Conference on Computer Vision (ECCV)*, 2018.

[18] R. R. Selvaraju, M. Cogswell, A. Das, R. Vedantam, D. Parikh, and D. Batra. Grad-cam: Visual explanations from deep networks via gradient-based localization. In *IEEE International Conference on Computer Vision (ICCV)*, 2017.

[19] F. Tung and J. J. Little. Collageparsing: Nonparametric scene parsing by adaptive overlapping windows. In *European Conference on Computer Vision (ECCV)*, 2014.

[20] C. Wah, S. Branson, P. Welinder, P. Perona, and S. Belongie. The Caltech-UCSD birds-200-2011 dataset. 2011.

[21] J. Wang, F. Zhou, S. Wen, X. Liu, and Y. Lin. Deep metric learning with angular loss. In *IEEE International Conference on Computer Vision (ICCV)*, 2017.

[22] C.-Y. Wu, R. Manmatha, A. J. Smola, and P. Krahenbuhl. Sampling matters in deep embedding learning. In *IEEE Conference on Computer Vision and Pattern Recognition (CVPR)*, 2017.

[23] M. D. Zeiler and R. Fergus. Visualizing and understanding convolutional networks. In *European Conference on Computer Vision (ECCV)*, 2014.

[24] Q. Zhang, Y. Nian Wu, and S.-C. Zhu. Interpretable convolutional neural networks. In *IEEE Conference on Computer Vision and Pattern Recognition (CVPR)*, 2018.

[25] M. Zheng, S. Karanam, Z. Wu, and R. J. Radke. Re-identification with consistent attentive siamese networks. In *IEEE Conference on Computer Vision and Pattern Recognition (CVPR)*, 2019.

[26] W. Zheng, Z. Chen, J. Lu, and J. Zhou. Hardness-aware deep metric learning. In *IEEE Conference on Computer Vision and Pattern Recognition (CVPR)*, 2019.

[27] B. Zhou, A. Khosla, A. Lapedriza, A. Oliva, and A. Torralba. Learning deep features for discriminative localization. In *IEEE Conference on Computer Vision and Pattern Recognition (CVPR)*, 2016.

[28] B. Zhou, Y. Sun, D. Bau, and A. Torralba. Interpretable basis decomposition for visual explanation. In *European Conference on Computer Vision (ECCV)*, 2018.

What is claimed is:

1. A system for machine learning architecture to generate interpretive data associated with data sets comprising:
a processor;
a memory coupled to the processor and storing processor-executable instructions that, when executed, configure the processor to:
obtain a subject data set;
generate a feature embedding based on the subject data set;
determine an embedding gradient weight based on a prior-trained embedding network and the feature embedding associated with the subject data set, the prior-trained embedding network defined based on a plurality of training embedding gradient weights generated based on a plurality of training samples, each of the plurality of training embedding gradient weights respectively corresponding to a feature map generated from a respective training sample from the plurality of training samples, and wherein the embedding gradient weight is determined based on querying a feature space for the feature embedding associated with the subject data set; and
generate signals for communicating interpretive data associated with the embedding gradient weight.

2. The system of claim 1, wherein the plurality of training embedding gradient weights associated with the prior-trained embedding network is based on back-propagated loss data associated with triplet training samples of a triplet embedding network.

3. The system of claim 2, wherein the back-propagated loss data represented by $\mathcal{L}_{tri}(a, p, n)$ is computed based on:

$$\mathcal{L}_{tri}(a,p,n)=[D(f_a,f_p)-D(f_a,f_n)+\delta]_+,$$

where f denotes an embedding vector, D(•) is a squared Euclidean distance, δ is a margin, and [•]₊ is a hinge function, a denotes anchor data sample, p denotes positive data sample, and n denotes negative data sample.

4. The system of claim 1, wherein the prior-trained embedding network is a triplet embedding network trained based on at least one triplet including an anchor data sample, positive data sample, and negative data sample.

5. The system of claim 1, wherein determining the embedding gradient weight is based on a nearest neighbor search of the feature embedding associated with the subject data set in a feature space associated with the prior-trained embedding network.

6. The system of claim 1, wherein the plurality of training embedding gradient weights is based on top-weights of gradient weights determined based on a plurality of sampled triples from the plurality of training samples.

7. The system of claim 1, wherein the plurality of training embedding gradient weights is based on average gradient weights of a plurality of sampled triples from the plurality of training samples.

8. The system of claim 1, wherein the subject data set is an image data set, and wherein the interpretive data provides heat map annotation to highlight subset regions of the image data set.

9. The system of claim 1, wherein the subject data set is a non-image data set.

10. The system of claim 1, wherein the prior-trained embedding network is based on a convolutional neural network.

11. A method for machine learning architecture to generate interpretive data associated with data sets comprising:
obtaining a subject data set;
generating a feature embedding based on the subject data set;
determining an embedding gradient weight based on a prior-trained embedding network and the feature embedding associated with the subject data set, the prior-trained embedding network defined based on a plurality of training embedding gradient weights generated based on a plurality of training samples, each of the plurality of training embedding gradient weights respectively corresponding to a feature map generated from a respective training sample from the plurality of training samples, and wherein the embedding gradient weight is determined based on querying a feature space for the feature embedding associated with the subject data set; and
generating signals for communicating interpretive data associated with the embedding gradient weight.

12. The method of claim 11, wherein the plurality of training embedding gradient weights associated with the prior-trained embedding network is based on back-propagated loss data associated with triplet training samples of a triplet embedding network.

13. The method of claim 12, wherein the back-propagated loss data represented by $\mathcal{L}_{tri}(a, p, n)$ is computed based on:

$$\mathcal{L}_{tri}(a,p,n)=[D(f_a,f_p)-D(f_a,f_n)+\delta]_+,$$

where: f denotes an embedding vector, D(•) is a squared Euclidean distance, δ is a margin, and $[•]_+$ is a hinge function, a denotes anchor data sample, p denotes positive data sample, and n denotes negative data sample.

14. The method of claim 11, wherein the prior-trained embedding network is a triplet embedding network trained based on at least one triplet including an anchor data sample, positive data sample, and negative data sample.

15. The method of claim 11, wherein determining the embedding gradient weight is based on a nearest neighbor search of the feature embedding associated with the subject data set in a feature space associated with the prior-trained embedding network.

16. The method of claim 11, wherein the plurality of training embedding gradient weights is based on top-weights of gradient weights determined based on a plurality of sampled triples from the plurality of training samples.

17. The method of claim 11, wherein the plurality of training embedding gradient weights is based on average gradient weights of a plurality of sampled triples from the plurality of training samples.

18. The method of claim 11, wherein the subject data set is an image data set, and wherein the interpretive data provides heat map annotation to highlight subset regions of the image data set.

19. The method of claim 11, wherein the subject data set is a non-image data set.

20. A non-transitory computer-readable medium or media having stored thereon machine interpretable instructions which, when executed by a processor, cause the processor to perform a computer-implemented method for machine learning architecture to generate interpretive data associated with data sets, the method comprising:
obtaining a subject data set;
generating a feature embedding based on the subject data set;
determining an embedding gradient weight based on a prior-trained embedding network and the feature embedding associated with the subject data set, the prior-trained embedding network defined based on a plurality of training embedding gradient generated based on a plurality of training samples, each of the plurality of training embedding gradient weights respectively corresponding to a feature map generated from a respective training sample from the plurality of training samples, and wherein the embedding gradient weight is determined based on querying a feature space for the feature embedding associated with the subject data set; and
generating signals for communicating interpretive data associated with the embedding gradient weight.

\* \* \* \* \*